(12) United States Patent
Chueh et al.

(10) Patent No.: US 7,956,664 B2
(45) Date of Patent: Jun. 7, 2011

(54) CLOCK DISTRIBUTION NETWORK ARCHITECTURE WITH CLOCK SKEW MANAGEMENT

(75) Inventors: Juang-Ying Chueh, Auburndale, MA (US); Jerry Kao, Ann Arbor, MI (US); Visvesh Sathe, Fort Collins, CO (US); Marios C. Papaefthymiou, Ann Arbor, MI (US); Conrad Ziesler, Granby, MA (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 11/949,673

(22) Filed: Dec. 3, 2007

(65) Prior Publication Data

US 2008/0150605 A1 Jun. 26, 2008

Related U.S. Application Data

(60) Provisional application No. 60/868,232, filed on Dec. 1, 2006.

(51) Int. Cl.
*H03K 3/00* (2006.01)
(52) U.S. Cl. ......... 327/293; 327/291; 327/292; 327/294
(58) Field of Classification Search .......... 327/291–304; 326/93–99; 716/13, 14
See application file for complete search history.

(56) References Cited

U.S. PATENT DOCUMENTS

| | | | |
|---|---|---|---|
| 5,559,463 A | 9/1996 | Denker et al. | |
| 5,838,203 A | 11/1998 | Stamoulis et al. | |
| 5,999,025 A | 12/1999 | New | |
| 6,011,441 A | 1/2000 | Ghoshal | |
| 6,150,865 A * | 11/2000 | Fluxman et al. | 327/292 |
| 6,720,815 B2 * | 4/2004 | Mizuno | 327/295 |
| 2002/0140487 A1 * | 10/2002 | Fayneh et al. | 327/295 |
| 2005/0114820 A1 * | 5/2005 | Restle | 716/13 |
| 2006/0152293 A1 | 7/2006 | McCorquodale et al. | |
| 2007/0168786 A1 | 7/2007 | Drake et al. | |

OTHER PUBLICATIONS

International Search Report and Written Opinion issued in related PCT application No. PCT/US2007/086304 mailed Mar. 3, 2009.
Chan, et al., "A 4.6GHZ Resonant Global Clock Distribution Network," *IEEE International Solid-State Circuits Conference* (2004).
Chueh, et al., "Two-Phase Resonant Clock Distribution," *Proceedings of the IEEE Computer Society Annual Symposium on VLSI New Frontiers on VLSI Design* (2005).
Cooke, et al., "Energy Recovery Clocking Scheme and Flip-Flops for Ultra Low-Energy Applications," *ISLPED '03* (2003).

(Continued)

*Primary Examiner* — Lincoln Donovan
*Assistant Examiner* — Brandon S Cole
(74) *Attorney, Agent, or Firm* — Lempia Summerfield Katz LLC

(57) ABSTRACT

Disclosed herein is a digital system that includes a distribution network having a path to carry a reference clock and an adjustable delay element disposed along the path, and first and second clock domains coupled to the distribution network to receive the reference clock and configured to be driven by respective clock waveforms, each of which has a frequency in common with the reference clock. The digital system further includes a phase detector coupled to the first and second clock domains to generate a phase difference signal based on the clock waveforms, and a control circuit coupled to the phase detector and configured to adjust the adjustable delay element based on the phase difference signal.

84 Claims, 17 Drawing Sheets

OTHER PUBLICATIONS

Drake, et al., "Resonant Clocking Using Distributed Parasitic Capacitance," *IEEE Journal of Solid-State Circuits*, vol. 39, No. 9 (2004).

Dunning, Jim, "An All-Digital Phase-Locked Loop with 50-Cycle Lock Time Suitable for High-Performance Microprocessors," *IEEE Journal of Solid-State Circuits*, vol. 30, No. 4 (1995).

Favalli, et al., "Testing Scheme for IC's Clocks," *IEEE European Design and Test Conference* (1997).

Sathe, et al., "A 1.1GHz Charge-Recovery Logic," *IEEE International Solid-State Circuits Conference* (2006).

Gutnik, et al., "Active GHz Clock Network Using Distributed PLLs," *IEEE Journal of Solid-State Circuits*, vol. 35, No. 11 (2000).

Ziesler, et al., "A 225 MHz Resonant Clocked ASIC Chip," ISLPED '03 (2003).

Chan, et al., "Design of Resonant Global Clock Distributions," Proceedings of the 21$^{st}$ International Conference on Computer Design, IEEE Computer Society, pp. 248-253 (2003).

Non-final office action dated Jun. 29, 2009, in U.S. Appl. No. 11/949,669 (now U.S. Patent No. 7,719,317).

* cited by examiner

| Counter [3:0] | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| n3 | 1 | 1 | 1 | 1 | 1 | 1 | 1 | 1 | 0 | 0 | 0 | 0 | 0 | 0 | 0 | 0 |
| n2 | 1 | 1 | 1 | 1 | 0 | 0 | 0 | 0 | 1 | 1 | 1 | 1 | 0 | 0 | 0 | 0 |
| n1 | 1 | 1 | 0 | 0 | 1 | 1 | 0 | 0 | 1 | 1 | 0 | 0 | 1 | 1 | 0 | 0 |
| n0 | 1 | 0 | 1 | 0 | 1 | 0 | 1 | 0 | 1 | 0 | 1 | 0 | 1 | 0 | 1 | 0 |
| nx2 | 0 | 0 | 0 | 0 | 0 | 0 | 0 | 0 | 0 | 0 | 0 | 0 | 1 | 1 | 1 | 1 |
| nx1 | 0 | 0 | 0 | 0 | 0 | 0 | 0 | 0 | 0 | 0 | 1 | 1 | 0 | 0 | 1 | 1 |
| nx0 | 0 | 0 | 0 | 0 | 0 | 0 | 0 | 0 | 0 | 1 | 0 | 1 | 0 | 1 | 0 | 1 |
| Width | 15 | 14 | 13 | 12 | 11 | 10 | 9 | 8 | 7 | 6.5 | 6 | 5.5 | 5 | 4.5 | 4 | 3.5 |

Figure 8(e)

CLOCK DISTRIBUTION NETWORK ARCHITECTURE WITH CLOCK SKEW MANAGEMENT

CROSS-REFERENCE TO RELATED APPLICATION

This application claims the benefit of U.S. provisional application entitled "Clock Distribution Network Architecture for Resonant-Clocked Systems," filed Dec. 1, 2006, and having Ser. No. 60/868,232, the entire disclosure of which is hereby expressly incorporated by reference.

STATEMENT REGARDING FEDERALLY SPONSORED RESEARCH OR DEVELOPMENT

This invention was made with government support under Contract No. DAAD19-03-1-0122 awarded by the Army Research Office. The government has certain rights in the invention.

BACKGROUND OF THE DISCLOSURE

1. Field of the Disclosure

The disclosure relates generally to clock distribution network architectures and, more particularly, to clock distribution network architectures having a plurality of domains.

2. Brief Description of Related Technology

Resonant clocking has been recently proposed for the design of energy-efficient clock distribution networks in synchronous digital systems. In resonant clocking, energy efficient operation is achieved by using an inductor to resonate the parasitic capacitance of the clock network. For any given resonant clock network, increasing inductor size results in lower energy dissipation but, at the same time, slower operating speed. Conversely, decreasing inductor size increases operating speed but also results in increased energy dissipation. Energy dissipation also depends on overall clock network resistance, with larger resistance resulting in higher energy dissipation and vice versa. Therefore, the design of large resonant clock networks that operate with high energy efficiency at high clock speeds presents a significant technical challenge.

Energy efficiency and operating speed aside, standard digital and mixed-signal design flows typically require that resonant clock networks operate in synchrony with a reference clock signal. Furthermore, to attain high performance, such networks attempt to exhibit low skew in clock arrival times across the entire chip. Another desirable property of clock networks in general is that their timing characteristics be relatively immune to variations in the fabrication process, operating conditions, and environmental conditions. Therefore, the design of large, fast, and energy-efficient resonant clock networks that achieve low clock skews, possess robust timing characteristics, and are directly compatible with standard digital and mixed-signal design flows represents a technical challenge of very substantial proportions.

One disclosure of design methods for resonant clock networks can be found in U.S. Pat. No. 5,734,285 ("Electronic circuit utilizing resonance technique to drive clock inputs of function circuitry for saving power"). A single resonant domain is described along with methods for synthesizing harmonic clock waveforms that include the fundamental clock frequency and a small number of higher-order harmonics. It also describes clock generators that are driven at a reference frequency, forcing the entire resonant clock network to operate at that frequency. However, the methods do not address scaling resonant clocking to encompass large chip-wide clock networks while achieving high energy efficiency.

Resonant clock network designs for local clocking (i.e., for driving flip-flops) are described and empirically evaluated in the following articles: "A 225 MHz Resonant Clocked ASIC Chip," by Ziesler C., et al., International Symposium on Low-Power Electronic Design, August 2003; "Energy Recovery Clocking Scheme and Flip-Flops for Ultra Low-Energy Applications," by Cooke, M., et al., International Symposium on Low-Power Electronic Design, August 2003; and "Resonant Clocking Using Distributed Parasitic Capacitance," by Drake, A., et al., Journal of Solid-State Circuits, Vol. 39, No. 9, September 2004. The designs set forth in these papers are directed to a single resonant domain, however, and do not describe the design of large-scale chip-wide resonant clock networks. In the article by Drake, the authors evaluate resonant clocking for driving the last stage of a buffered clock network. However, they do not provide any methods for designing a large-scale chip-wide resonant clock network. Moreover, the clock generator at the root of the resonant clock network they evaluate is self-resonating and is not driven at the reference frequency of the clock signal that is distributed by the buffered clock network. Finally, they provide no methods for physical layout or skew management in a large-scale resonant clock.

The design and evaluation of resonant clocking for high-frequency global clock networks was addressed in "Design of Resonant Global Clock Distributions," by Chan, S., et al., International Conference on Computer Design, 2003. This article focuses on global clocking, however, and does not provide any methods for designing a large-scale resonant network that distributes clock signals with high energy efficiency all the way to the individual flip-flops in a chip. Moreover, the clock generator described in this article is not driven by a reference clock and therefore, it is not straightforward to integrate in a standard digital design flow.

SUMMARY OF THE DISCLOSURE

In accordance with one aspect of the disclosure, a digital system includes a distribution network having a path to carry a reference clock and an adjustable delay element disposed along the path, first and second clock domains coupled to the distribution network to receive the reference clock and configured to be driven by respective clock waveforms, each of which has a frequency in common with the reference clock, a phase detector coupled to the first and second clock domains to generate a phase difference signal based on the clock waveforms, and a control circuit coupled to the phase detector and configured to adjust the adjustable delay element based on the phase difference signal.

In some cases, at least one of the first and second clock domains includes a clock generator driven by the reference clock to generate a resonant clock signal as the respective clock waveform. The digital system may then further include a rectifier coupled to the phase detector to convert the resonant clock signal into a square waveform. The rectifier may include a flip-flop configured to receive the resonant clock signal as a clock input.

The control circuit may include an integrator to track the phase difference signal over time. The control circuit may further include control logic responsive to the phase difference signal to generate an increment/decrement signal, and the integrator may include a counter configured to receive the increment/decrement signal from the control logic.

In some cases, the adjustable delay element includes a digitally controlled delay line.

The adjustable delay element may include a first digitally controlled delay line through which the reference clock passes to reach the first clock domain, the distribution network may further include a second digitally controlled delay line through which the reference clock passes to reach the second clock domain, and the control circuit may be configured to control the first and second digitally controlled delay lines individually.

In accordance with another aspect of the disclosure, a method is useful for controlling a digital system having first and second clock domains. The method includes the steps of distributing a reference clock to each of the first and second clock domains, generating a signal indicative of a phase difference between respective clock waveforms in the first and second clock domains based on the reference clock, and adjusting in accordance with the phase difference signal a delay element disposed on a path carrying the reference clock.

In some cases, the method further includes the step of generating a resonant clock signal from the reference clock as the respective clock waveform in at least one of the first and second clock domains. The method may then further include the step of converting the resonant clock signal into a square waveform to facilitate the generating step.

The adjusting step may include the step of tracking the phase difference over time. The tracking step may then include driving a counter with an increment/decrement signal in accordance with the phase difference signal.

In accordance with another aspect of the disclosure, a digital system includes a distribution network having a path to carry a reference clock and an adjustable delay element disposed along the path, a resonant clock domain coupled to the distribution network to receive the reference clock and including a clock generator to generate a resonant clock waveform from the reference clock, a non-resonant clock domain coupled to the distribution network to receive the reference clock and configured to be driven by a non-resonant clock waveform in accordance with the reference clock, a phase detector coupled to the resonant and non-resonant clock domains to generate a phase difference signal based on the resonant clock and non-resonant waveforms, and a control circuit coupled to the phase detector and configured to adjust the adjustable delay element based on the phase difference signal.

In some cases, the digital system further includes a rectifier coupled to the phase detector to convert the resonant clock signal into a square waveform. The rectifier may include a flip-flop configured to receive the resonant clock signal as a clock input.

In accordance with another aspect of the disclosure, a method is useful for controlling a digital system having a plurality of clock domains. The method includes the steps of distributing a reference clock via a clock distribution network coupled to each of the plurality of clock domains, and adjusting a programmable delay element disposed on a path carrying the reference clock to a selected clock domain of the plurality of clock domains. The adjusting step includes responding to a control signal directed to controlling the programmable delay element.

The method may further include the step of generating a resonant clock signal from the reference clock as a clock waveform in a resonant clock domain of the plurality of clock domains.

In some cases, the plurality of clock domains includes a resonant clock domain and a non-resonant clock domain.

The adjusting step may further include overriding a delay adjustment control signal generated from feedback based on a phase difference between respective clock waveforms in a pair of the plurality of clock domains.

BRIEF DESCRIPTION OF THE DRAWING FIGURES

For a more complete understanding of the disclosure, reference should be made to the following detailed description and accompanying drawing figures, in which like reference numerals identify like elements in the figures, and in which:

FIG. 1 illustrates a high-level view of a hierarchical clock distribution network architecture in accordance with one aspect of the disclosure;

FIGS. 2(a) and 2(b) are exemplary clock distribution networks for resonant clock domains of the clock distribution network architecture of FIG. 1 in accordance with further aspects of the disclosure;

Figure 5:
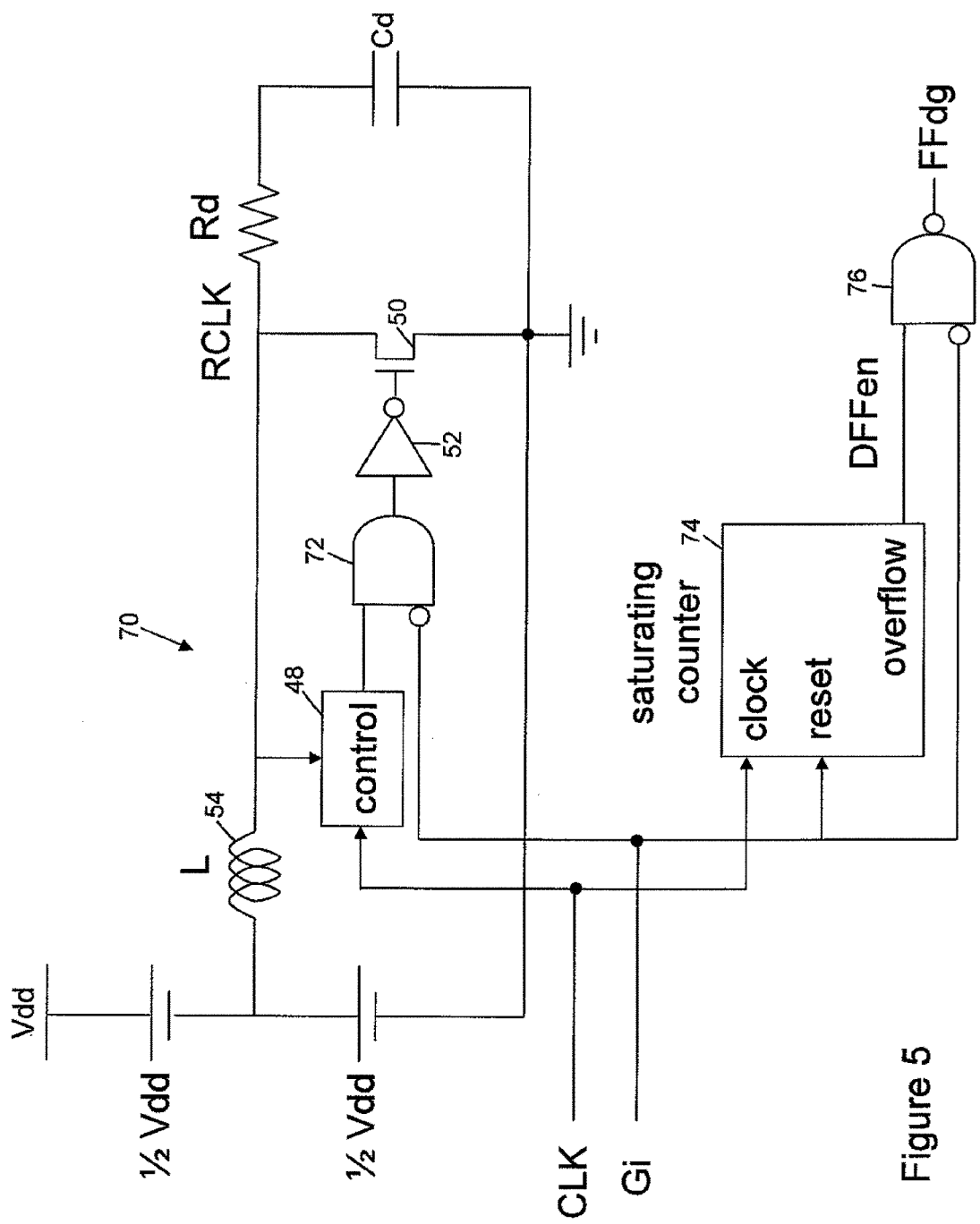
FIG. 5 illustrates an exemplary implementation of resonant clock generation with clock gating of an entire resonant clock domain in accordance with another aspect of the disclosure.
Figure 6A:
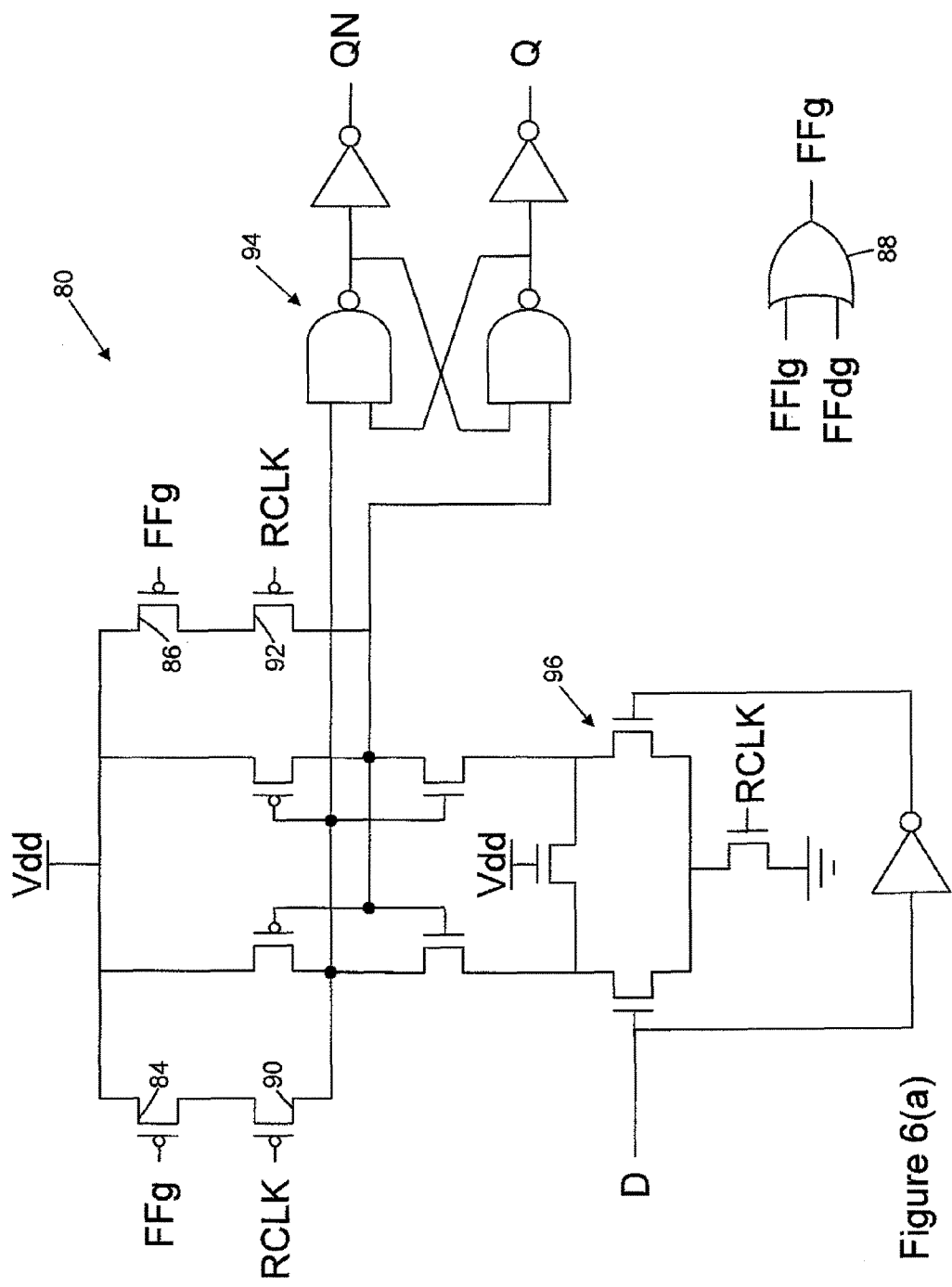
Figure 6B:
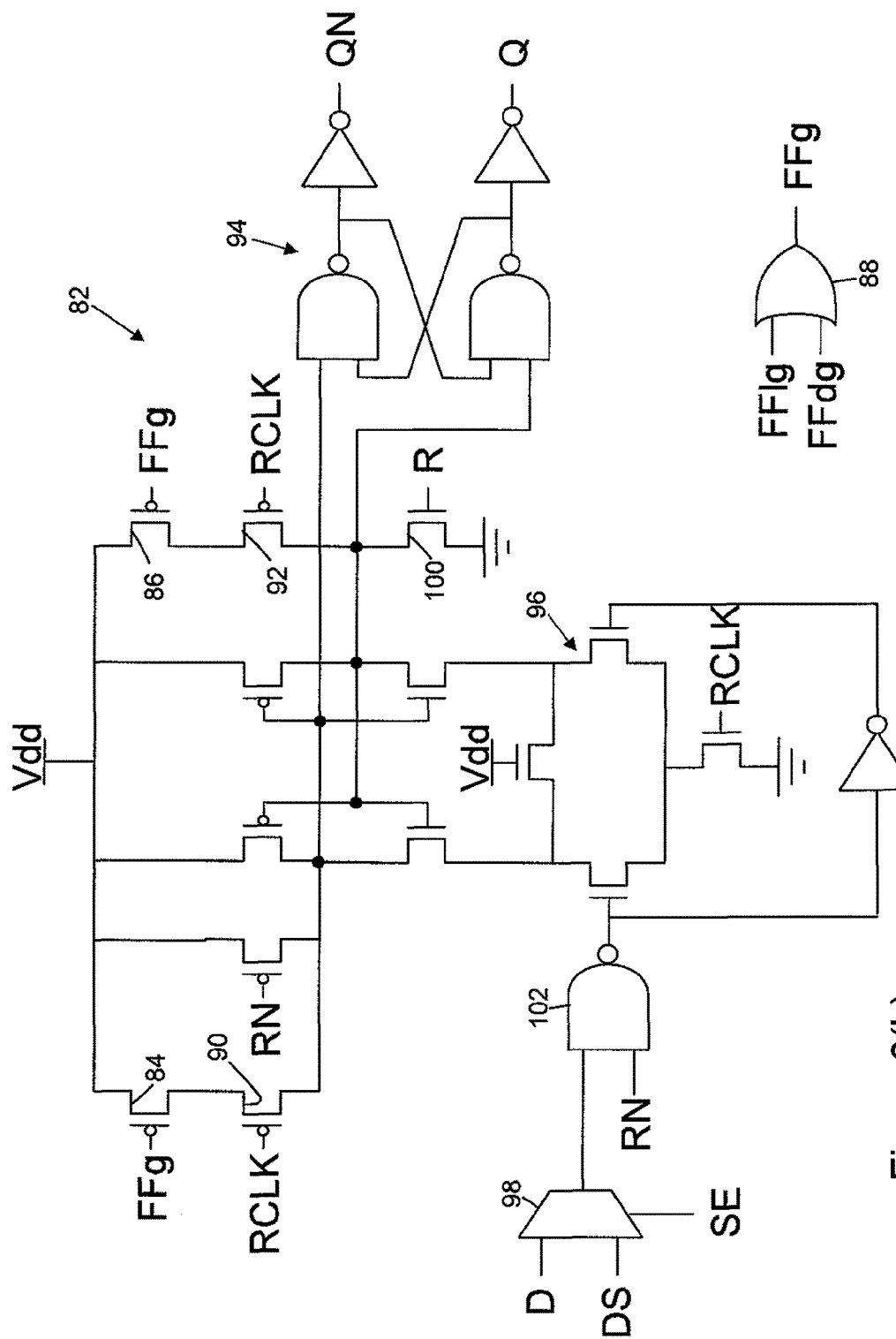

FIGS. 6(a) and 6(b) illustrate exemplary gated flip-flops that can be used with an essentially sinusoidal clock waveform within a resonant clock domain and in conjunction with a gating signal for disabling individual flip-flops and the technique of FIG. 5 for disabling all flip-flops within a resonant clock domain;

FIGS. 7(a) through 7(d) illustrate exemplary implementations of DLL-based and external control techniques for reducing skew between two clock domains in the clock distribution network architecture in accordance with another aspect of the disclosure; and FIGS. 8(a) through 8(e) illustrate a digitally controller delay line (DCDL) with 8-bit counter input, coarse delay adjustment, and fine delay adjustment for use in conjunction with the techniques of FIGS. 7(a) through 7(d).

While the disclosed systems and methods are susceptible of embodiments in various forms, there are illustrated in the drawing (and will hereafter be described) specific embodiments of the invention, with the understanding that the disclosure is intended to be illustrative, and is not intended to limit the invention to the specific embodiments described and illustrated herein.

DETAILED DESCRIPTION OF PREFERRED EMBODIMENTS

An architecture for fast, large-scale, and energy-efficient resonant clock distribution networks that achieve low clock skews, possess robust timing characteristics, and are directly compatible with standard digital and mixed-signal design flows is described below. By relying on hierarchy, the disclosed architecture yields large-scale resonant clock networks for chips of arbitrary size. At the top levels of the hierarchy, the disclosed architecture may include a buffered clock distribution network, although aspects of the disclosed systems and methods are not limited to practice with any particular type of distribution network. For example, the clock distribution network need not include buffers, and may be as simple as a single line. At the low hierarchy levels, the disclosed network is arranged in a number of circuit domains. As described below, the circuit domains may include any number of buffered (e.g., conventional or non-resonant) clock domains for local clock distribution to individual flip-flops as well as any number of resonant clock domains for local clock generation and distribution of resonant clock waveforms to individual flip-flops. However, within each of the resonant clock domains, clock buffers are eliminated.

The top-level global clock distribution network may deliver a "square" reference clock to the root of each of these buffered or resonant clock domains. In turn, the circuit or clock domains are driven by this reference clock, operating in synchrony with each other at the common reference frequency. High operating speeds and energy-efficient operation are accomplished through allocation of capacitance and inductance to each of the resonant clock domains. In some cases, the common frequency of the domains may be offset from the natural resonant frequency of the LC circuit established in each resonant domain by the capacitance and inductance. The offset may arise from manufacturing or other variations, or involve a matter of design preference. In either case, the resonant domains may be configured such that the quality factor (Q) can accommodate an offset from the natural resonant frequency without suffering detrimental losses.

Within each of the resonant clock domains, clock buffers are eliminated and clock distribution is performed over a metal-only network. As described below, a buffer-free domain and other aspects of the disclosed systems result in advantageous timing properties, including relative immunity to process and environmental variations or intentional changes in voltage supply levels (i.e., voltage scaling). To drive the clock signal across its entire span, each resonant clock domain deploys a clock generator at the root of its network. Examples of the clock generator are described further below with reference to FIGS. 3 and 4. This generator generally switches at the rate of the reference clock from the global clock distribution network. Using an inductor to resonate the capacitive load of its domain, the clock generator yields local (i.e., intra-domain) clock signals of approximately sinusoidal shape, resulting in local clock distribution with significantly reduced clock skew. Low local skew may also be ensured through the use of symmetrical or other grid distribution networks within a resonant clock domain. Furthermore, local skew is relatively immune to fabrication-related process parameter variations, due to the elimination of clock buffers from the resonant clock domain. The elimination of local clock buffers also results in robust clock timing within each resonant clock domain with respect to changes or variations in operating conditions such as, for example, supply voltage scaling and supply droop.

Across clock domains, skew is kept within bounds determined at design time through the application of skew-management techniques such as delay-locked loops (DLLs). Exemplary skew-management techniques are described further below with reference to FIGS. 7(a) through 7(d) and 8(a) through 8(e). In some cases, the disclosed architecture implements techniques for monitoring and comparison of clock arrival times at two clock domains, e.g., adjacent resonant or non-resonant clock domains. The results from this comparison are used to adjust the arrival times of the global reference clock to the roots of the clock domains until their skew falls below the target bound. Other techniques based on an external control signal may be implemented to programmatically adjust the arrival times of the global reference clock.

The disclosed clock distribution network architectures can also support one or more clock gating techniques. These techniques are described further below with reference to FIGS. 5 through 6(b). In particular, for selective clock gating within a resonant clock domain, clock gating is applied by disabling selected flip-flops individually. This version of clock gating essentially implements input gating, because the resonant clock itself is not shut down. Across an entire resonant clock domain, clock gating is deployed by gating the reference clock delivered to the corresponding clock generator. In this technique, all flip-flops in the resonant domain are disabled to ensure that they do not erroneously latch any transient values. To restart the resonant clock domain, the clock generator is first started by un-gating the reference clock. When resonant clock amplitude reaches an acceptable level (within a few cycles), all flips-flops are re-enabled, and the resonant clock domain becomes fully operational. In any buffered clock domains or at the level of the global clock tree, clock gating can be performed in the same manner as in conventional clock networks.

Figure 1:
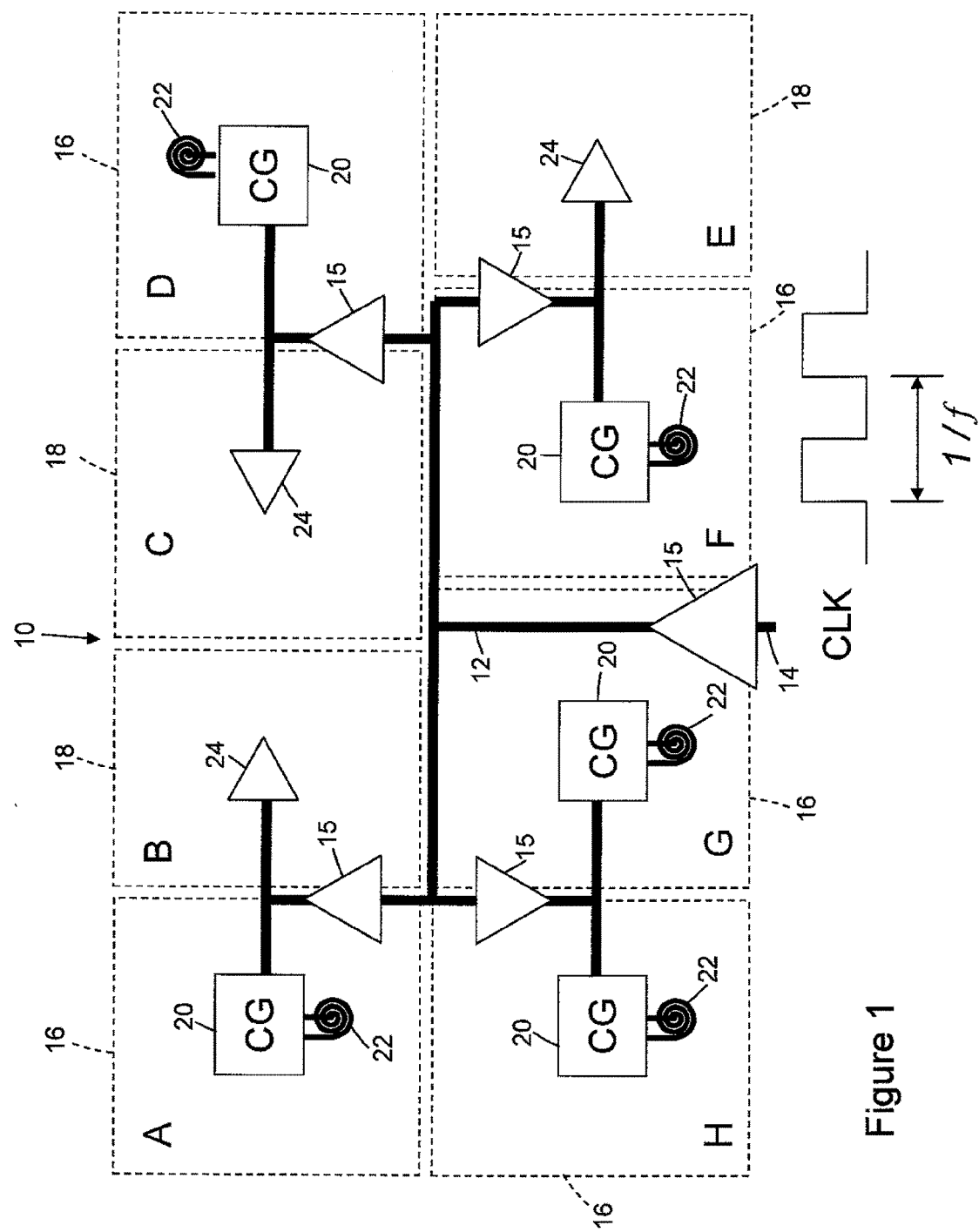

FIG. 1 illustrates a high-level view of the hierarchical clock distribution network architecture indicated generally at 10. At the top level, the network architecture 10 includes a conventional buffered H-tree network 12 for globally distributing a reference clock CLK of frequency f. A number of alternative buffered network topologies may also be used for this global distribution. The reference clock is supplied to a root 14 of the H-tree network 12, and its source can be a crystal, a phase-locked loop (PLL), a clock up/down-converter, or any other generator of a periodic clock signal. The hierarchical clock distribution network architecture 10 in FIG. 1 may include any number of buffers 15 to facilitate the distribution of the reference clock to multiple resonant clock domains 16 (also labeled A, D, F, G, and H) and conventional (or non-resonant) clock domains 18 (also labeled B, C, and E) located at the leaves of the global H-tree network 12. The size of each domain 16, 18 is a design parameter and depends, among other factors, on the target energy efficiency and operating frequency. Each resonant clock domain 16 includes a clock generator (CG) 20, which is connected to an inductor 22. Each inductor 22 may be on-chip or off-chip, and is depicted for illustration purposes only as a generic spiral. Each clock generator 20 uses its respective inductor 22 to resonate the capacitance of the resonant clock domain 16 and, with very high energy efficiency, generate a clock waveform of essentially sinusoidal shape. Unlike the buffer-free resonant clock domains, each conventional clock domain 18 may include a buffered distribution network (schematically shown as respective intra-domain buffers 24) to further distribute the reference clock CLK of essentially square shape across the clock domain.

Figure 2A:
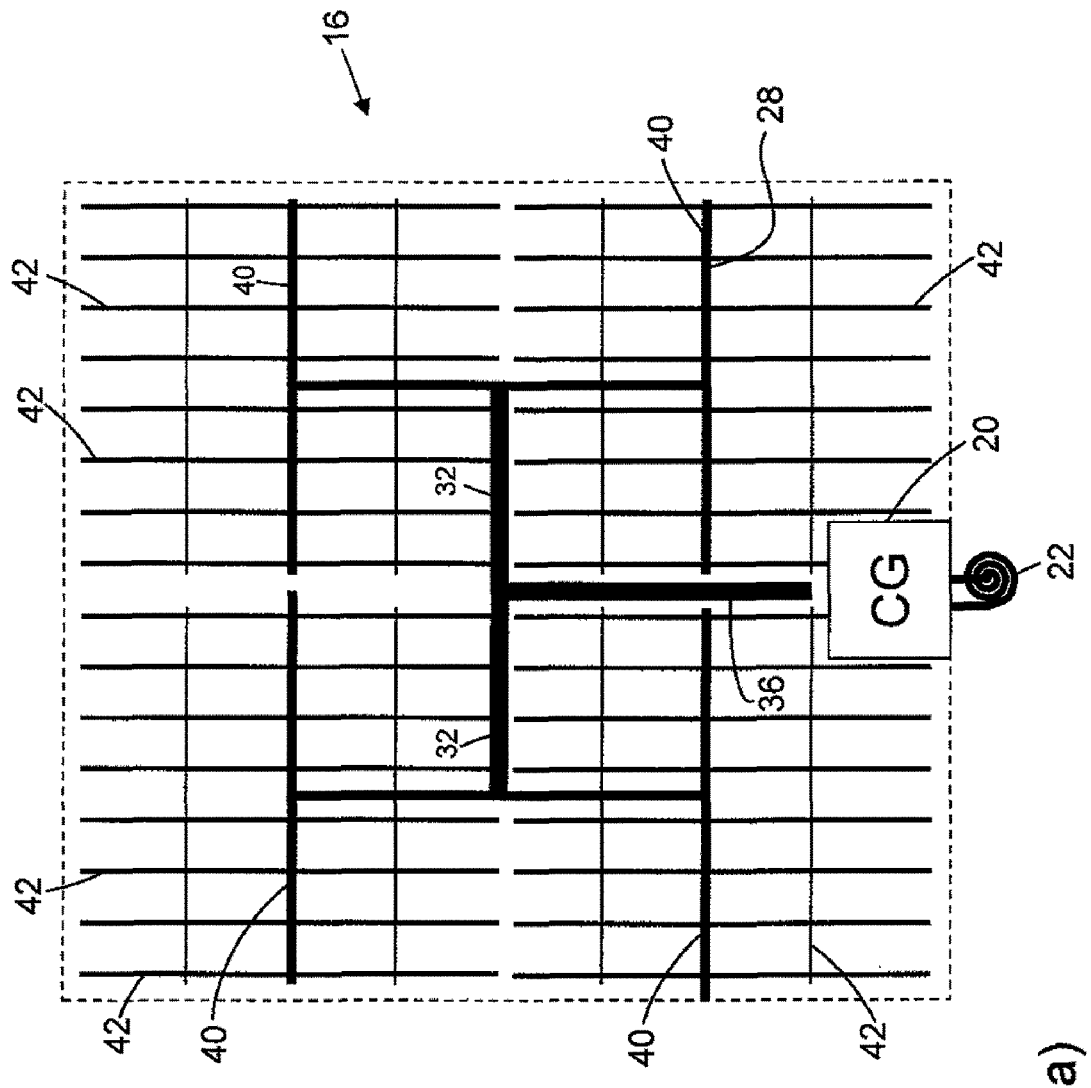
Figure 2B:
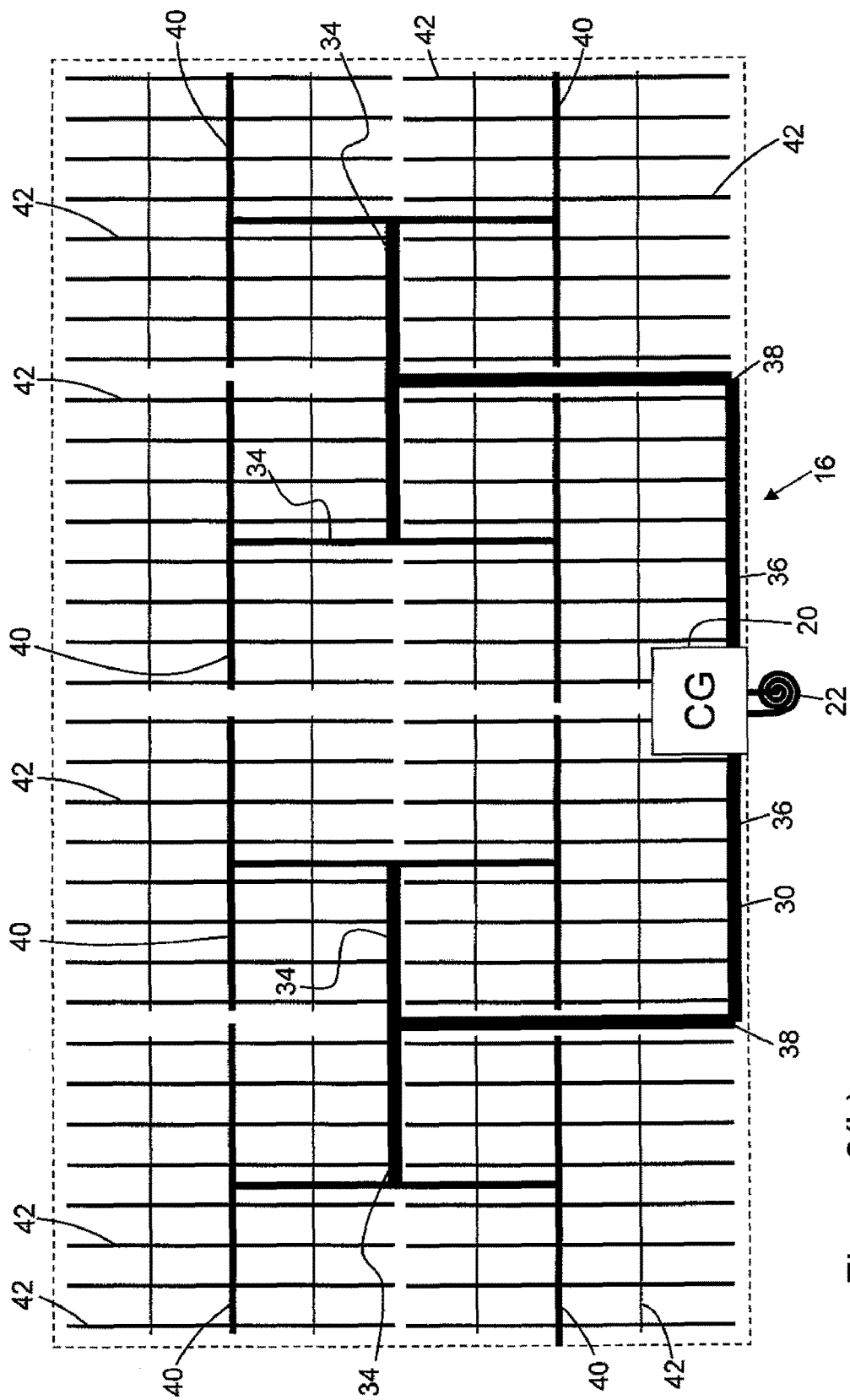

Two exemplary buffer-free grid distribution networks 28 and 30 for the distribution of a clock waveform within each resonant clock domain 16 are illustrated in FIGS. 2(a) and 2(b). Without any buffers, the networks 28, 30 are metal-only. The resonant clock domains 16 are thus not burdened or limited by the voltage supply-dependent semiconductor components of the buffers found in conventional clock distribution networks. As a result, each resonant clock domain 16 can accommodate voltage scaling and other variations in operational context without introducing skew. To further provide for low skew, each network 28, 30 relies on hierarchical distribution. In these exemplary cases, symmetric H-tree structures 32, 34 are located at a root 36, or top level, of each network 28, 30. In the case of FIG. 2(b), the root 36 includes a pair of main branches 38. The symmetrical topology of the structures 32, 34 can help lead to low skew, and any number of alternative symmetrical clock distribution network arrangements may also be used. It should also be noted that, when implemented, these distribution arrangements may not be perfectly symmetric (e.g., due to process variation), but that relatively small asymmetries can be tolerated. Leaves 40 of the top-level H-trees 32, 34 are connected to grid structures 42 that are, in turn, connected to the flip-flops or other domain circuit elements (not shown). The grid network 28 of FIG. 2(*a*) shows one possible clock distribution network arrangement for a resonant clock domain of square shape. The grid network 30 in FIG. 2(*b*) shows one possible network arrangement for a resonant domain with 2:1 aspect ratio. Clock domains of other aspect ratios or shapes can be accommodated by expanding these basic network arrangements, as desired.

One property of the disclosed architectures is that the clock generators 20 of the resonant clock domains 16 are driven by the global reference clock CLK. Therefore, the sinusoidal clocks in the resonant clock domains 16 run essentially in synchrony with (i.e., at the same frequency f as) the global reference clock CLK. Another aspect of the disclosed architectures is that each architecture 10 provides for the cooperation of conventional and resonant clock domains within the same design. For example, in the context of a System-on-Chip (SoC) design, it enables the selective deployment of any number of resonant clock domains 16 in intellectual property (IP) drop-in cores or in any parts of the design selected by the SoC architect. Furthermore, it is compatible with the SoC design practice of using multiple clocks, each running at its own frequency. By associating each top-level tree 32, 34 with a single frequency, it is ensured that all associated clock domains operate at that frequency.

Figure 3:
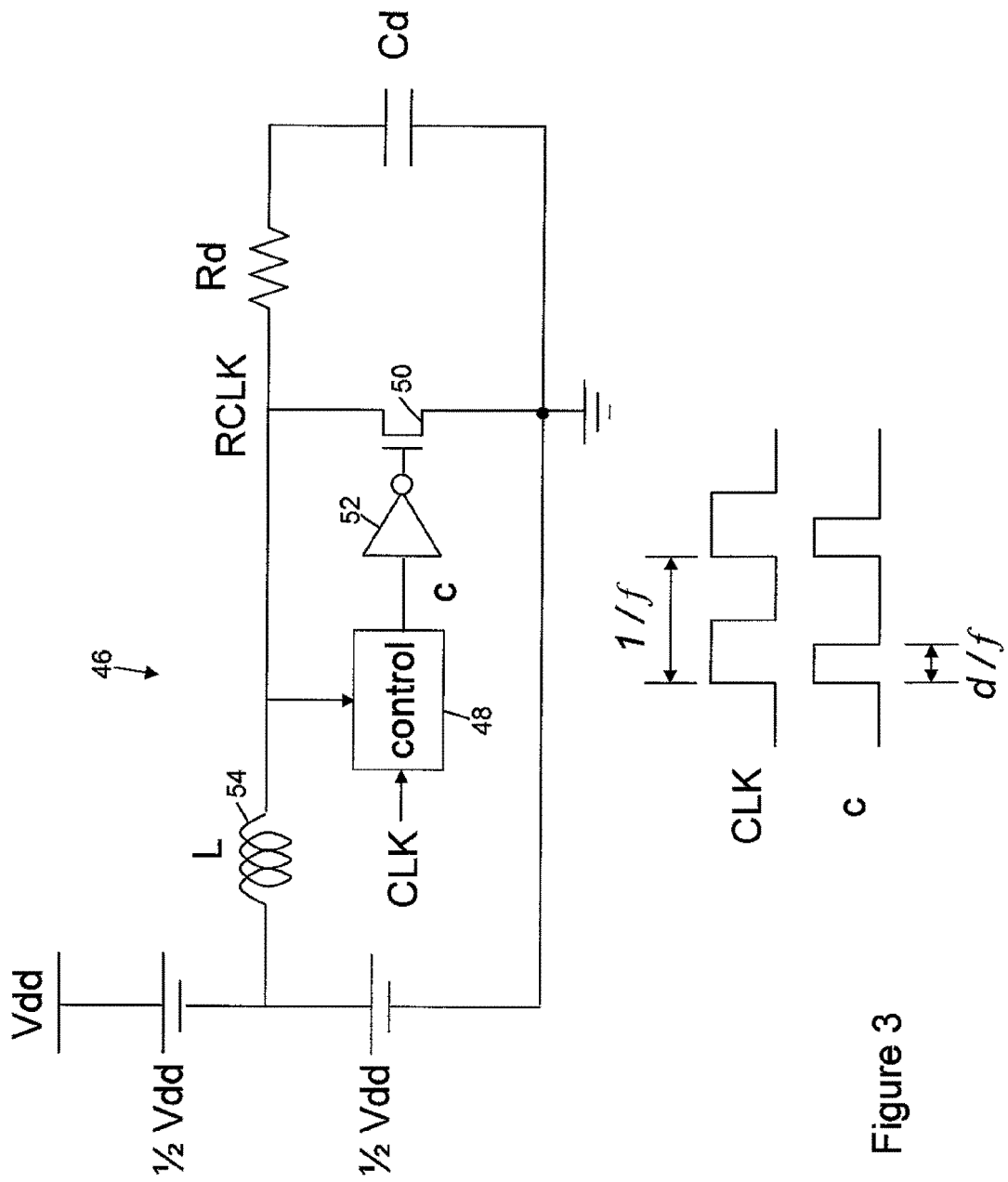
FIG. 3 illustrates one embodiment of an exemplary clock generator that can be used in an embodiment of the resonant clock domains of FIG. 2(a) or FIG. 2(b) to generate a single-phase resonant clock waveform of essentially sinusoidal shape and of the same frequency as the global reference clock distributed via the clock distribution network architecture of FIG. 1.

FIG. 3 illustrates an exemplary embodiment of a simple clock generator indicated generally at 46 that can be used to generate a single-phase resonant clock waveform RCLK of essentially sinusoidal shape and of the same frequency as the global reference clock. The clock generator 46 may incorporate one or more aspects of the clock generator described in U.S. Pat. No. 6,742,132, the entire disclosure of which is hereby incorporated by reference. The clock generator 46 is shown with a resistive load Rd and capacitive load Cd that include, among other contributions, the total resistance and capacitance of the all-metal clock distribution network 28, 30 and the flip-flops in the resonant clock domain 16. The clock generator 46 is driven at the rate f of the global reference clock CLK, replenishing the charge in the resonant clock domain every cycle. Specifically, signal CLK is input to a control circuit 48 that generates a periodic signal c of frequency f and duty cycle d. Alternatively, the reference clock CLK may already have the desired duty cycle d. Signal c is subsequently used to switch a replenishing NMOS transistor 50 via an inverter 52. An appropriately chosen inductor 54 of value L is used to resonate the total capacitive load Cd and generate a resonant clock waveform of essentially sinusoidal shape. To maximize energy efficiency, the value L of the inductor 54 may be chosen so that the natural frequency fn of the resulting resonant system is approximately equal to the frequency f of the reference clock. Therefore, the inductor value L is selected so that the following equation holds: $f = 1/2\pi\sqrt{LCd}$.

Figure 4:
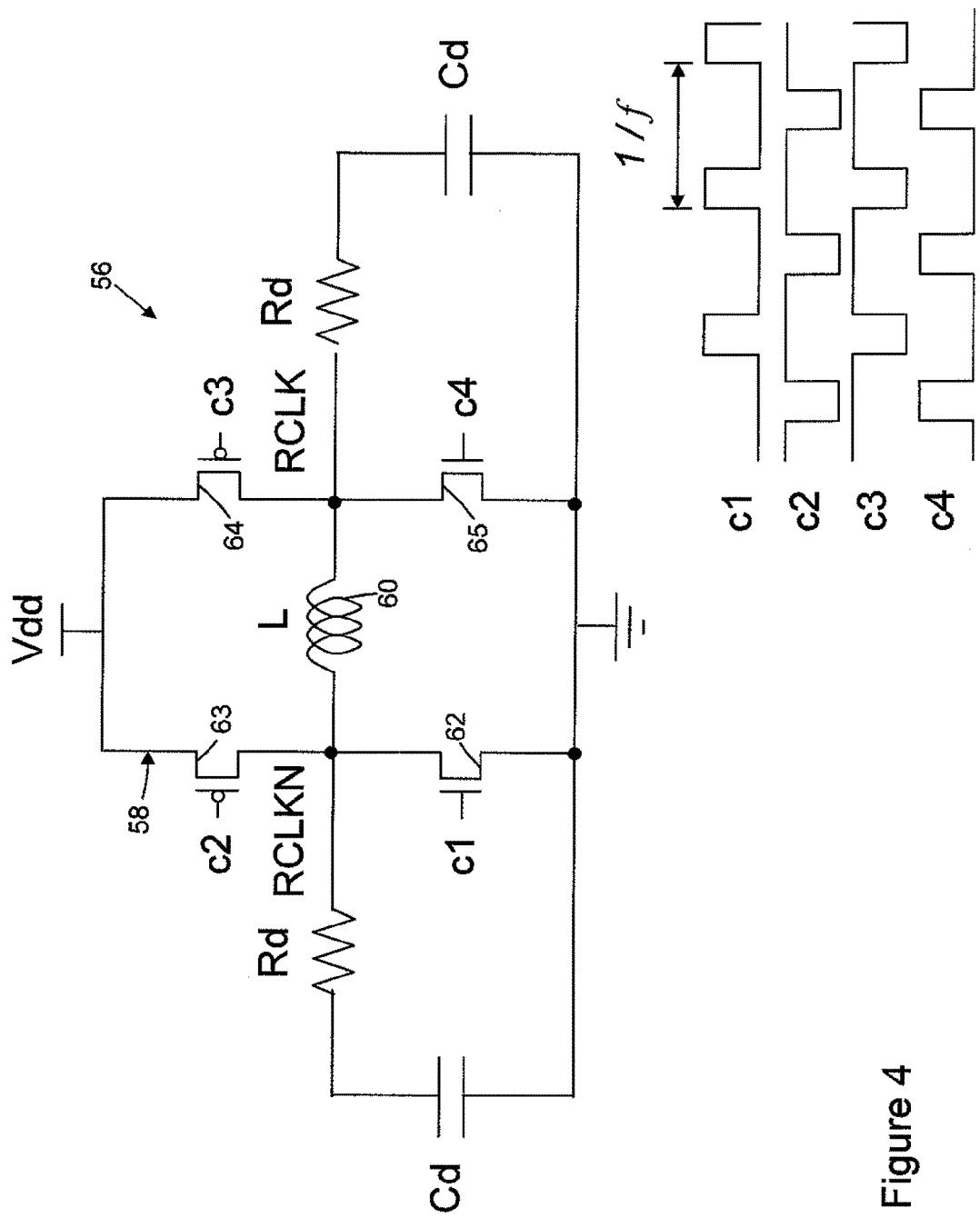
FIG. 4 illustrates an exemplary two-phase clock generator that can be used in another embodiment of the resonant clock domains of FIG. 2(a) or FIG. 2(b)

FIG. 4 illustrates an exemplary embodiment of a two-phase clock generator indicated generally at 56 and configured for use in one of the resonant clock domains 16. In any one architecture network 10, any number of alternative (i.e., different) clock generators can be used. In the embodiment shown in FIG. 4, an H-bridge circuit 58 is used in conjunction with an inductor 60 to generate a two-phase resonant clock waveform of essentially sinusoidal shape. The two clock phases RCLK and RCLKN have a relative phase-shift of 180 degrees. Switches 62-65 of the H-bridge 58 are driven by two pairs of pulses (c1, c3) and (c2, c4) at the rate f of the global reference clock. The pulses in each pair are of opposite polarity, and the two pairs have a relative phase-shift of 180 degrees. Further information regarding H-bridges is set forth in the following articles, the respective disclosures of which are hereby incorporated by reference: "Two-Phase Resonant Clock Distribution," Chueh, J. Y., by Sathe, V., and Papaefthymiou, M. C., Proceedings of the 2005 IEEE International Symposium on VLSI, May 2005; and "A 1.1 GHz Charge Recovery Logic," by Sathe, V., Chueh, J. Y., and Papaefthymiou, M. C., International Solid-State Circuits Conference, February 2006. Adaptations thereof have been described in U.S. Pat. No. 5,559,463 (free-running) and U.S. Pat. No. 5,838,203 (driven by reference clock), the entire disclosures of which are hereby incorporated by reference. With the H-bridge clock generator 56, if each phase sees a load of Cd, the resulting effective load capacitance is Cd/2, because the two capacitive loads are connected in series.

Numerous alternative possible arrangements and designs are suitable for the circuitry clocked by the clock generator 56. For example, the two-phase H-bridge clock generator 56 in FIG. 4 can be used to drive two sets of flip-flops of opposite polarity (all rising-edge flip-flops on phase 1, all falling-edge flip-flops on phase 2) while using an inductor of size 2 L. If inductor resistance does not increase significantly with inductance (an assumption that holds for off-chip inductors), then the H-bridge clock generator 56 is capable of driving twice as many flip-flops with half the energy dissipation and at the same speed as the single-phase clock generator 46 of FIG. 3. Alternatively, the H-bridge clock generator 56 can be used to drive other kinds of digital circuitry such as, for example, the dynamic circuitry described in the above-referenced article entitled "A 1.1 GHz charge Recovery Logic".

Due to the deployment of buffer-less, all-metal clock distribution networks within each resonant clock domain, the disclosed architectures enjoy robust timing and significantly reduced timing uncertainty in the presence of fabrication-related process variations, variations in operating conditions, or changes in supply voltage, whether intentional or unintentional. The elimination of clock buffers removes a significant source of timing variation from the clock network and ensures that post-fabrication skew will closely track the skew estimated during design. Variations in the physical characteristics of clock buffers (e.g., in the doping, width, and length of their devices) would otherwise cause significant variations in the propagation delays of clock signals along different paths of the clock distribution network, and thus result in significant variations in skew. The situation is exacerbated in recent nanometer processes that present increasingly wider device parameter variations. For these reasons, the resonant clock domains 16 of the disclosed architectures are immune to device-related variations and are instead only affected by variations in the characteristics of the metal lines.

Variations in the voltage (e.g., 1.2 V to 0.9 V) supplied to the buffers of conventional networks during chip operation result in clock jitter, adding uncertainty to clock arrival times. In the disclosed architecture, the clock signals of the resonant clock domains are substantially free of jitter. Since the clock generators 46, 56 replenish only a small fraction (e.g., 20%) of the total energy in the resonant clock system, the impact of any variations in voltage supply levels is restricted only to that fraction and is thus significantly reduced.

When supply voltage is scaled by design (e.g., in a system that uses dynamic voltage scaling for power management), clock buffers in conventional clock distribution networks are slowed down, and clock skews are exacerbated. In the disclosed architecture, the skew performance of the resonant clock domains 16 remains practically unaffected by applications or designs involving voltage scaling.

In accordance with further aspects of the disclosures, the disclosed architectures for resonant clock distribution support clock gating techniques at both the individual device level and at domain-wide basis. Such fine and coarse clock gating thus controls the application of the resonant clock waveforms to individual flip-flops within a resonant clock domain and for all flip-flops within a resonant clock domain. To gate individual flip-flops, a control or gating signal FFlg is used to disable the flip-flops in question. Unlike conventional clock gating methods that block the propagation of the clock signal in parts of the clock distribution network, the disclosed architectures allow for the continued distribution of the resonant clock within the corresponding resonant clock domain. In this way, the clock waveform still sees the capacitance of any disabled flip-flops, but without update their states and, thus, their outputs do not toggle.

Clock gating of an entire resonant clock domain 16 involves discontinuing the application of the resonant clock waveform within the domain 16. In the examples described below, discontinued application of the resonant clock signal includes disabling the global reference clock input CLK to the clock generator 46, 56 as well as disabling all flip-flops in the domain. When the global reference clock is gated, the replenishing function of the clock generator 46, 56 stops, the energy stored in the resonant domain 16 is dissipated on the resistance Rd, and the amplitude of the resonant clock waveform eventually reaches zero. For each resonant clock domain i, the disclosed architecture includes a gating signal Gi for interrupting the global reference clock at the corresponding clock generator 46, 56. The gating signal Gi is also used to derive a control or gating signal FFdg that disables all flip-flops in the resonant clock domain, ensuring that they do not erroneously store data while the resonant clock is winding down. If multiple resonant clock domains 16 are always to be gated concurrently, then a common gating signal can be used collectively.

When the gating signal Gi is disabled and the reference clock once again starts driving the clock generator 46, 56, the amplitude of the resonant clock waveform reaches its maximum (or a desired target) within a few cycles. At that time, the flip-flops are enabled once again, and the resonant clock domain 16 operates at the rate of the reference clock. The exemplary architectures may include a signal DFFen for enabling the flip-flops in the resonant clock domain 16. This signal is asserted a few cycles after the reference clock is enabled and is de-asserted as soon as the reference clock is gated by Gi. The number of cycles required to enable DFFen can be determined at design time.

FIG. 5 illustrates an exemplary implementation of clock generation circuitry indicated generally at 70 and configured for clock gating at the domain level, i.e., for an entire resonant clock domain 16. The circuitry 70 incorporates certain aspects of the single-phase design of FIG. 3, although other resonant clock generation techniques may be used. Those components in common with the clock generator 46 are identified with like reference numerals. In this exemplary case, the gating signal Gi is provided to an AND logic gate 72 to qualify the output of the control 48 that drives the replenishing switch 50 of the clock generator 70 at the rate f of the reference clock CLK. In an alternative implementation, the gating signal Gi can be provided as an input directly to the control 48. The gating signal Gi is also used as an input to a saturating counter 74 that is used to generate the signal DFFen. When Gi is asserted, the clock generator 70 does not replenish the resonant clock waveform, the counter 74 is kept at reset, and DFFen remains de-asserted. When Gi is de-asserted, the clock generation is enabled, and the counter 74 starts counting in synchrony with the reference clock CLK. When the counter 74 reaches a number of cycles pre-determined at design time, it enables DFFen and remains saturated until the next time that Gi is asserted. The flip-flop disabling signal FFdg is generated via another AND logic gate 76 and distributed to all flip-flops in the resonant clock domain 16. When FFdg is asserted, all flip-flops in the domain 16 are disabled and do not latch any new inputs. The AND logic gate 76 in FIG. 5 ensures that FFdg is asserted exactly when Gi is asserted or DFFen is de-asserted. Symmetrically, FFdg is de-asserted only when Gi is de-asserted and DFFen is asserted. In that case, the flip-flops are enabled, and their state is updated in synchrony with the resonant clock RCLK. Other straightforward implementations are possible in view of the operation of the circuit 70, generally incorporating the idea of waiting a pre-determined number of cycles to assert DFFen.

In an alternative implementation of clock gating logic, the saturating counter 74 is replaced by a clocked comparator that compares the amplitude of the resonant clock with a pre-determined reference voltage. When Gi is asserted, the comparator is disabled, and the signal DFFen remains de-asserted. When Gi is de-asserted, the comparator is enabled. The signal DFFen is asserted as soon as the resonant clock amplitude reaches the pre-determined voltage level. Other alternative implementations are possible, relying on the idea of dynamically detecting the level of the resonant clock to assert DFFen.

FIG. 6(a) illustrates an exemplary flip-flop indicated generally at 80 and configured for compatibility with the above-described gate-enable techniques. The flip-flop 80 can be used with an essentially sinusoidal clock waveform RCLK within a resonant clock domain and in conjunction with both the signal FFlg for disabling individual flip-flops and the signal FFdg for disabling all flip-flops within a resonant domain. FIG. 6(a) illustrates a basic version for accommodating such coarse and fine gating, while FIG. 6(b) illustrates another exemplary flip-flop indicated generally at 82 and configured with additional reset and scan functions. Common elements are identified with like reference numerals.

With reference to both FIGS. 6(a) and 6(b), when either FFlg or FFdg is asserted, two PMOS devices 84, 86 are driven by a signal FFg, which is generated via an OR logic gate 88 responsive to FFlg and FFdg, to disconnect two pre-charge PMOS devices 90, 92 driven by RCLK from the supply Vdd. As a result, the flip-flops 80, 82 retain their present state stored in cross-coupled NAND gates indicated generally at 94. When both FFlg and FFdg are de-asserted, the two PMOS devices 84, 86 driven by FFg establish connection with the supply rail Vdd, and the flip-flop state is updated in synchrony with the resonant clock RCLK. Numerous alternative implementations of the flip-flops 80, 82 with gate enable are possible. For example, an NMOS device driven by FFNg (the inverse of FFg) can be inserted between an NMOS footer (evaluation tree) indicated generally at 96 and configured to be clocked by RCLK and ground, replacing the two PMOS devices 84, 86 driven by FFg.

Further details regarding the operation and configuration of flip-flops suitable for resonant clock signals and gating functions can be found in U.S. Patent Publication No. 2007/0096957, the entire disclosure of which is hereby incorporated by reference.

The flip-flop 80 of FIG. 6(a) can be configured to support set/reset functions and scanning. An exemplary implementation with reset and scan is shown in FIG. 6(b) as the flip-flop 82. Opposite-polarity signals R and RN are used to provide resetting inputs to the cross-coupled NAND pair 94. The signal RN is also used to provide resetting inputs to the two NMOS devices in the evaluation tree 96. The signal SE is used by, for instance, a multiplexer 98 to select between data and scan-data as the input to the flip-flop 82. In this exemplary case, the reset signals R and RN override the scan via an NMOS transistor 100 an NAND logic gate 102, forcing the flip-flop 82 to reset.

One aspect of the disclosed systems and methods involves the energy-efficient design of the resonant clock domains 16 through the appropriate selection of capacitance and inductance. The design methodology is driven by the quality factor Q of the resonant clock domain. The Q factor determines the relative efficiency of resonant clocking with respect to conventional clocking in each resonant clock domain, as shown by the following derivation. The energy dissipated when switching the capacitance Ci of the clock network from low to high and then back to low for one clock cycle is $Ec=C_i V^2$.

In resonant mode, the energy dissipated during one cycle is approximately equal to $Er=2(R_i C_i/(T/2))C_i V^2$, where T is the period of the global reference clock (which is also the clock period of the resonant clock), and Ri is the total resistance in the resonant clock network. Therefore, the relative dissipation Er/Ec of resonant over conventional clocking is approximately given by the equation. $Er/Ec=4 R_i C_i/T$.

To maximize energy efficiency, the inductor Li may be selected so that the natural frequency of the resonant system equals the frequency $f=1/T$ of the global reference clock CLK that drives the clock generator. Substituting into the above equation, we obtain $Er/Ec=4 R_i C_i/T=4 R_i C_i/2\pi \sqrt{L_i C_i}=2/\pi Q$, where $Q=\sqrt{L_i/C_i}/R_i$ is known as the quality factor Q of the resonant system. It follows that Q provides an indication of the relative power savings achievable by resonant clocking (assuming that the capacitance of the conventional network and its resonant counterpart is the same). For example, to achieve 5 times lower energy dissipation by resonant clocking, Q should equal 5.

In some cases, the disclosed clock distribution network architecture deploys resonant clock domains within a Q value range selected to provide flexibility and compatibility with process and operational conditions. For example, one possible Q value range is between about 2 and about 20. Although such lower Q values correspond to less energy-efficient clock network operation, they may nevertheless be desirable in the context of the clock network architectures with the driven clock generators 46, 56 and alternatives thereof. Specifically, resonant clock networks with low Q values (i.e., below 10) can still yield substantial power savings (e.g., for Q=5, energy savings are approximately 80%) and can be driven close to their maximum energy efficiency even when the global reference clock is offset by as much as about 15% or about 25% from resonance, i.e., the natural resonant frequency established by the capacitance and inductance of the resonant clock domain 16. On the other hand, in resonant clock networks with higher Q values (e.g., greater than about 20 or about 30), minor deviations in the natural frequency of the system from the global reference frequency that drives it can result in dramatic deterioration of its energy efficiency. Accordingly, high-Q resonant clock networks with self-resonating (as opposed to driven) clock generators may be deployed to allow the system to operate with maximal efficiency at its natural frequency.

More generally, the driven clock domains described herein may be configured such that the operating frequency can be offset from the natural resonant frequencies without detrimental results. As the network can run off-resonance due to process variations or other circumstances, each circuit domain is configured such that a quality factor (Q) of each circuit domain remains below a limit established by process tolerances and predictions of other variations.

In accordance with another aspect of the disclosed clock distribution network architecture, it is possible to decrease skew across different resonant clock domains by selectively connecting their respective grids at the lowest levels of their resonant clock distribution networks. During implementation of the skew management technique disclosed herein, such interconnected resonant clock domains cannot be clock-gated independently of each other. In some cases, such as the case of resonant clock domains kept electrically separate, the disclosed skew management techniques involve and include a DLL-based approach to minimize or remove skew across the resonant clock domains. One attribute of the disclosed architecture that permits the use of DLLs for skew management across resonant clock domains is that all of its clock domains operate at the frequency of the global reference clock. Another characteristic of the DLL-based approach used in the disclosed architecture is the use of flip-flop elements for converting the sinusoidal clock waveforms of the resonant clock domains into conventional, square clock waveforms with relatively sharp rising edges, which can then be compared with respect to their relative phase difference. In other cases, adjustments made to minimize skew between domains (whether resonant or non-resonant) can be made based on a control signal independent of any phase comparison or other feedback, as described below.

Figure 7A:
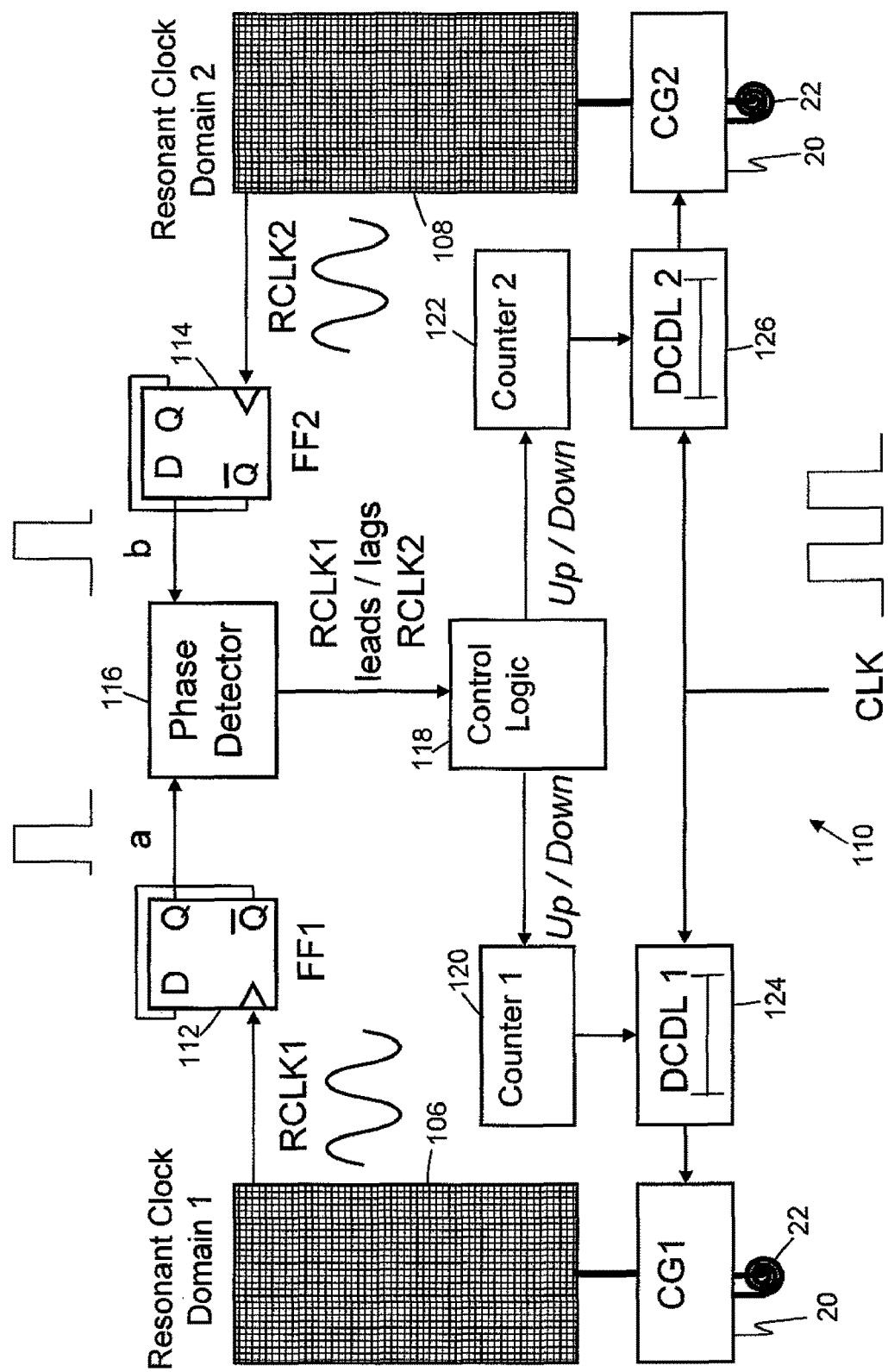
Figure 7B:
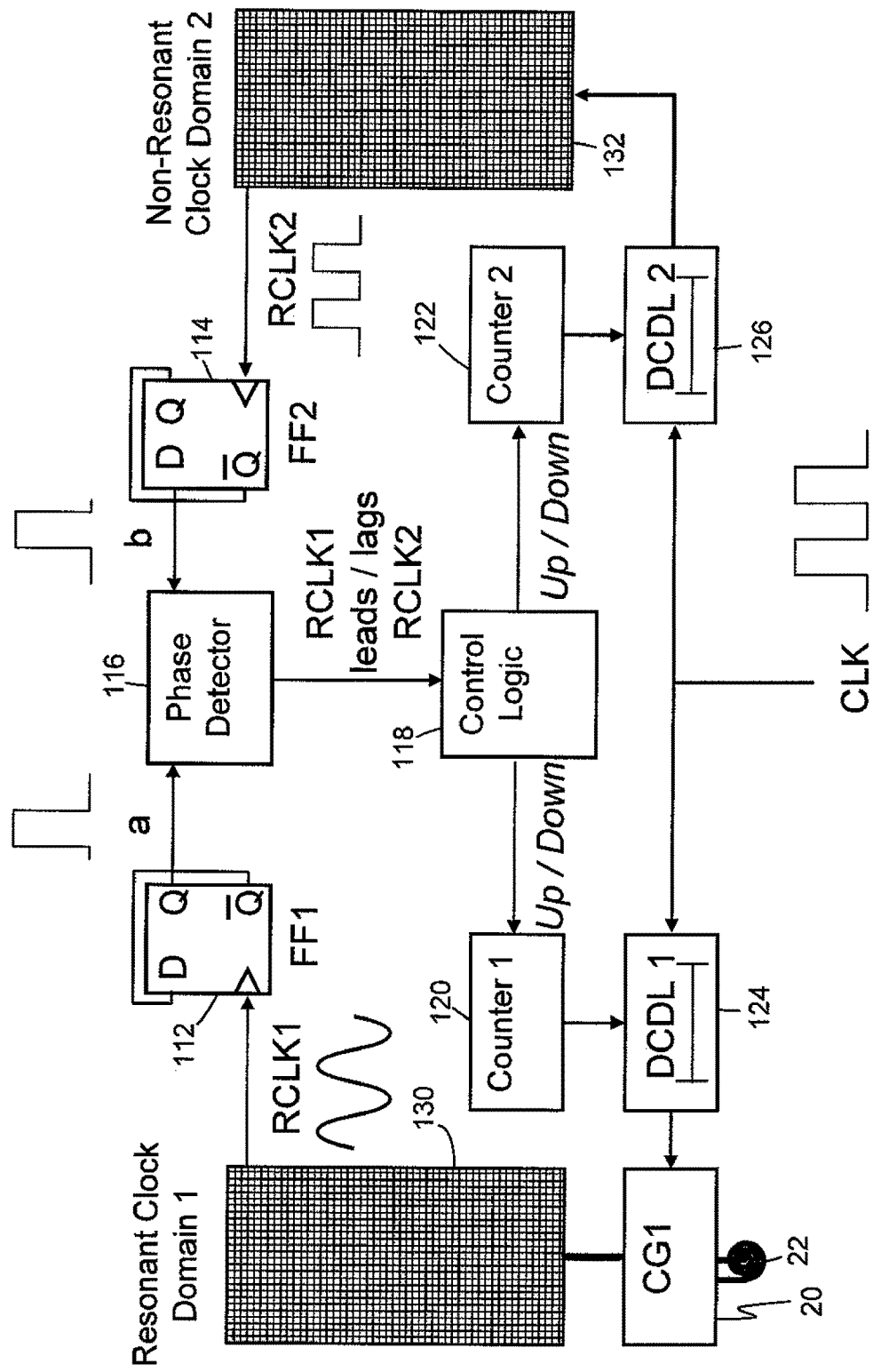
Figure 7C:
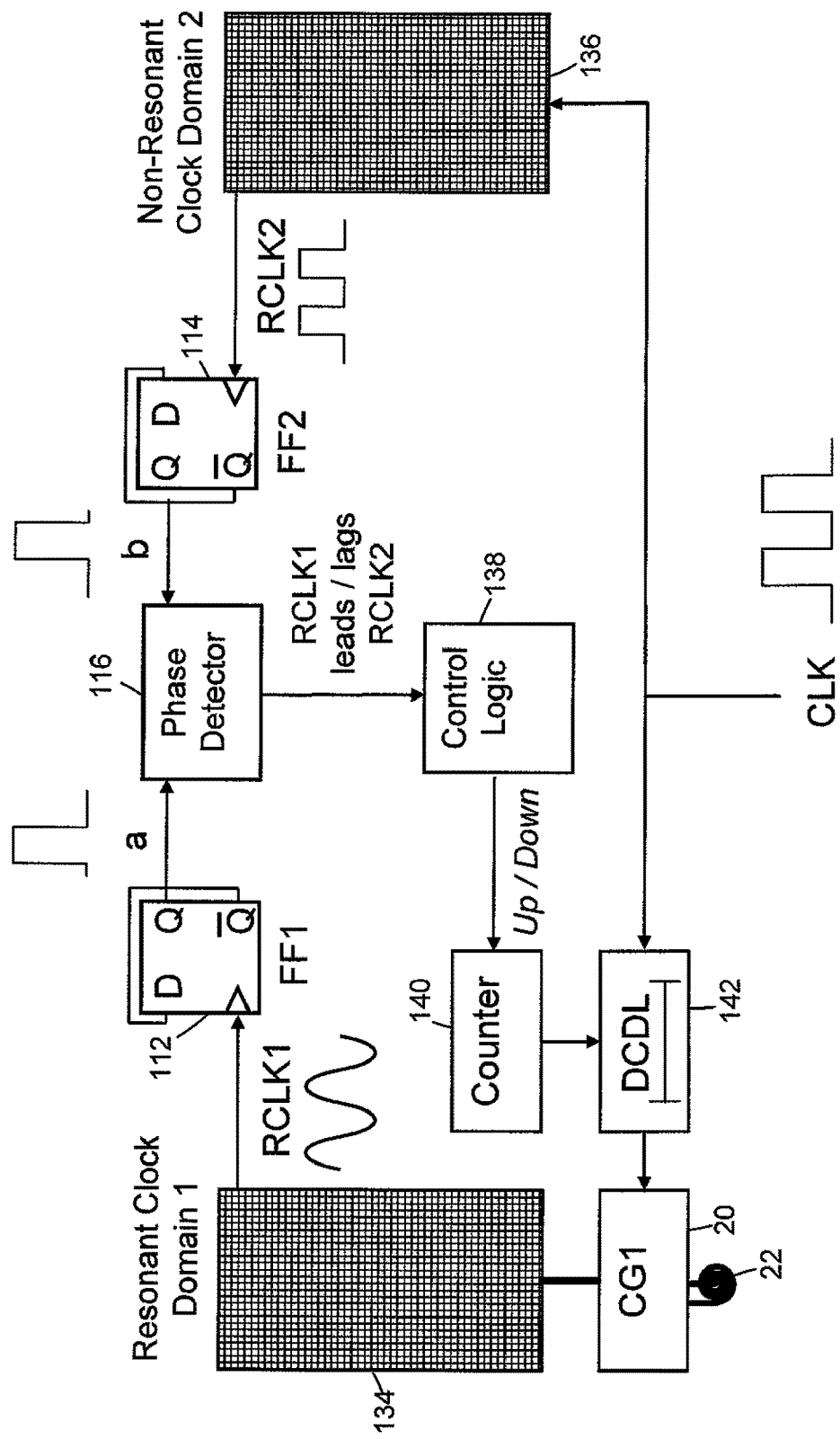
Figure 7D:
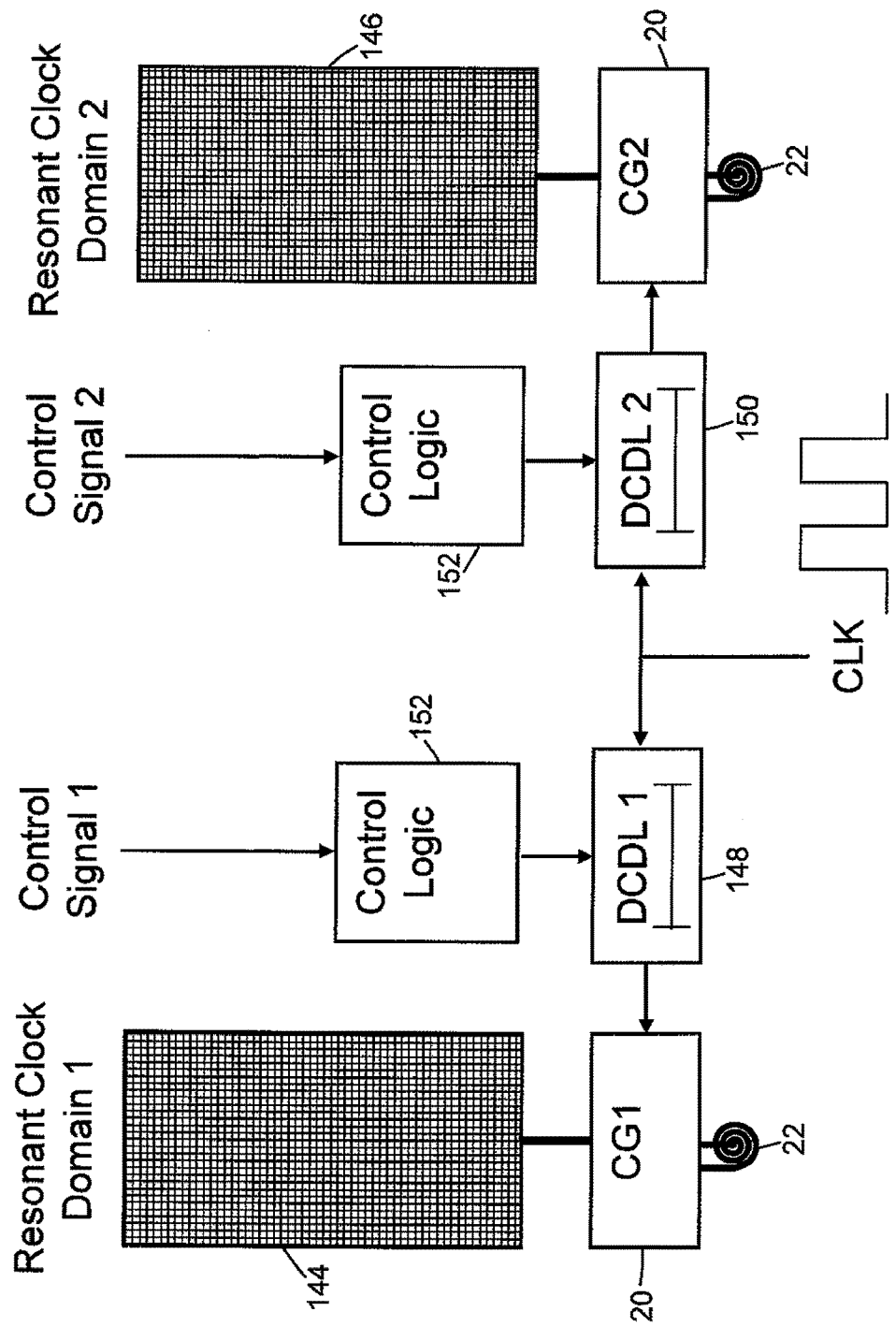

FIGS. 7(a) through 7(c) illustrate exemplary embodiments of DLL-based techniques for reducing, while FIG. 7(d) illustrates an exemplary embodiment of skew management based on an external control signal. A number of additional embodiments are possible, including those that combine one or more aspects of the embodiments illustrated.

The technique shown in FIG. 7(a) manages skew between two resonant clock domains 106, 108 (Resonant Clock Domain 1 and Resonant Clock Domain 2) of a digital system arranged, for instance, in accordance with the clock distribution network architectures described above. To that end, each resonant clock domain 106, 108 includes respective clock generation circuitry like the clock generator 20 and the inductor 22 described in connection with FIG. 1. A skew management circuit indicated generally at 110 couples the two clock domains 106, 108 together, and includes a pair of flip-flops 112, 114 (FF1 and FF2), a phase detector 116, a controller 118, a pair of counters 120, 122 (Counter 1 and Counter 2), and a pair of adjustable delay elements, such as digitally controlled delay lines 124, 126 (DCDL1 and DCDL2), disposed in the path carrying the reference clock CLK to the respective domain 106, 108. In operation, in each of the two resonant clock domains 106, 108, the sinusoidal clock waveform at a leaf of a distribution grid network 128 is used to clock the corresponding flip-flop 112 or 114 (FF1 or FF2). The sinusoidal clock waveforms are provided as clock inputs to the flip-flops 112, 114 to generate corresponding signals with sharp edges whose phase difference can then be compared using the phase detector 116 in a straightforward manner. The phase detector 116 may then identify the leading output edge between the two flip-flops 112, 114. Depending on the outcome of the phase detection stage, the controller 118 issues appropriate signals that update the count values of one or both of the two counters 120, 122. Alternative embodiments may utilize other devices to track or integrate the results of the comparison over time. In the exemplary cases shown, the counts are used to set the delay of their corresponding delay lines 124, 126 and shift the arrival times of the global reference clock signal CLK to the respective clock generators 20 of the corresponding resonant clock domains 106, 108. For example, if the FF1 output is ahead of the FF2 output, Counter 1 is incremented to delay the arrival of CLK to Clock Domain 1, while Counter 2 is decremented to speed up the arrival of CLK to Clock Domain 2. The controller 118 may be configured such that the arrival times continue to be adjusted every cycle, until the difference in the toggle times of the flip-flop outputs falls within a specified range, or the leading output edge starts alternating between FF1 and FF2. At that time, no further adjustments to the delay lines are made. Throughout this process of skew adjustment, the flip-flops in the resonant clock domains 106, 108 are kept reset to ensure that no erroneous state is latched.

FIG. 7(b) illustrates an alternative embodiment in which the above-described DLL-based skew management technique is implemented in connection with a resonant clock domain 130 (Resonant Domain 1) and a conventional clock domain 132 (Non-Resonant Domain 2). When conventionally clocked domains are involved, the "square" clock signals from the leaves of the conventional clock domain 132 may be input directly to the phase detector (or comparator) 116. In this case, however, the square clock waveform is provided as an input to the flip-flop 114 just as in the resonant clock case, so that any variation in phase arising from the flip-flop processing equally affects both sides of the comparison.

FIG. 7(c) is directed to yet another embodiment to illustrate a design alternative involving the manner in which the delay is adjusted. Specifically, only one of the two clock domains 134, 136 has a delay element disposed on the path carrying the reference clock CLK. In this case, a controller 138 directs only a single counter (or other integrator) 140 to track the phase difference over time to control a single digitally controlled delay line 142. Having only a single (or one-sided) delay adjustment may be used when the range provided by a dual adjustment is not necessary, or when desired based on layout or other design considerations. On the other hand, a dual adjustment may be useful in cases where it is more convenient to include two smaller delay lines than a single, larger delay line. In cases involving a single delay line, the path in which the delay line is located may lead to either a resonant clock domain or a non-resonant clock domain, as desired.

FIG. 7(d) illustrates a delay adjustment technique not based on phase difference feedback from the clock domains. The technique may be used as an alternative to the feedback-based techniques, or as an override or secondary adjustment technique in designs where the feedback is also available. In this exemplary case, a delay adjustment between two resonant clock domains 144, 146 involves two control signals (control signals 1 and 2) configured to set, or program, the delay value arbitrarily (e.g., without regard to feedback). Alternative embodiments may involve one or more non-resonant clock domains (as described above with FIG. 7(b)), or only a single control signal to direct only a single adjustable delay element (as described above with FIG. 7(c)). The control signals may constitute signals generated by, or received from, a source (not shown) external to, and independent of, the clock domains. The control signals may be utilized in a one-time adjustment of delay elements 148, 150, or may be provided to make subsequent adjustments, as desired. To this end, the skew management technique may involve one or more controllers 152 configured to be responsive to the control signals to effectuate the delay adjustments. The controllers 152 may, but need not, be integrated to any desired extent, and further integrated with the controller 118 (FIG. 7(a)) in cases involving DLL-based adjustment as well.

FIGS. 8(a) through 8(e) illustrate exemplary digitally controller delay lines (DCDL) with 8-bit counter input, coarse delay adjustment, and fine delay adjustment. Any one or more of these DCDLs may be utilized in connection with the skew management techniques described above.

Figure 8A:
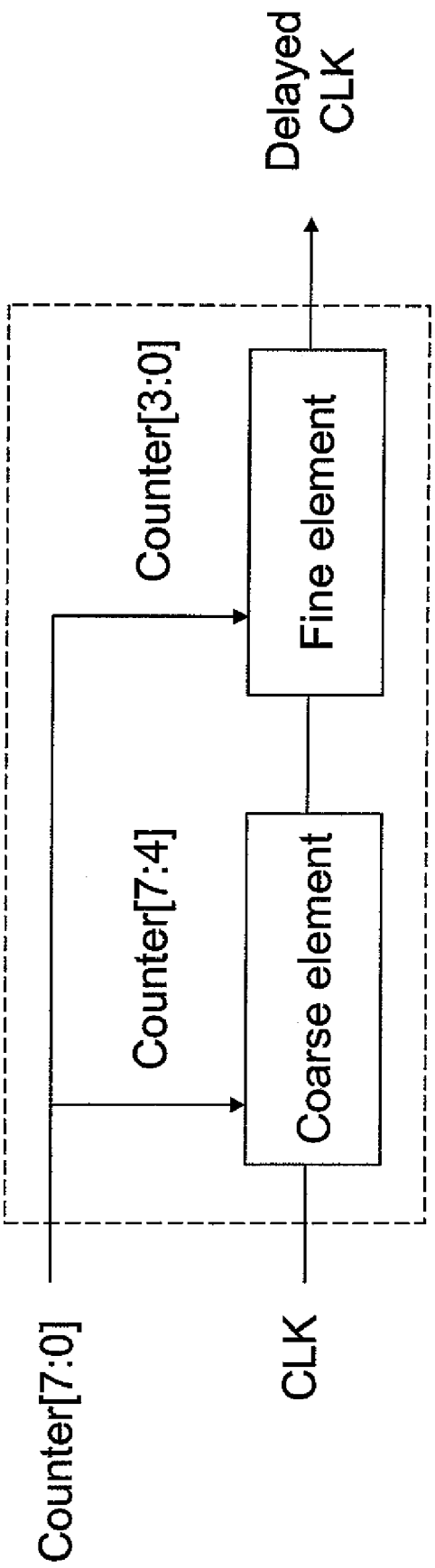
Figure 8B:
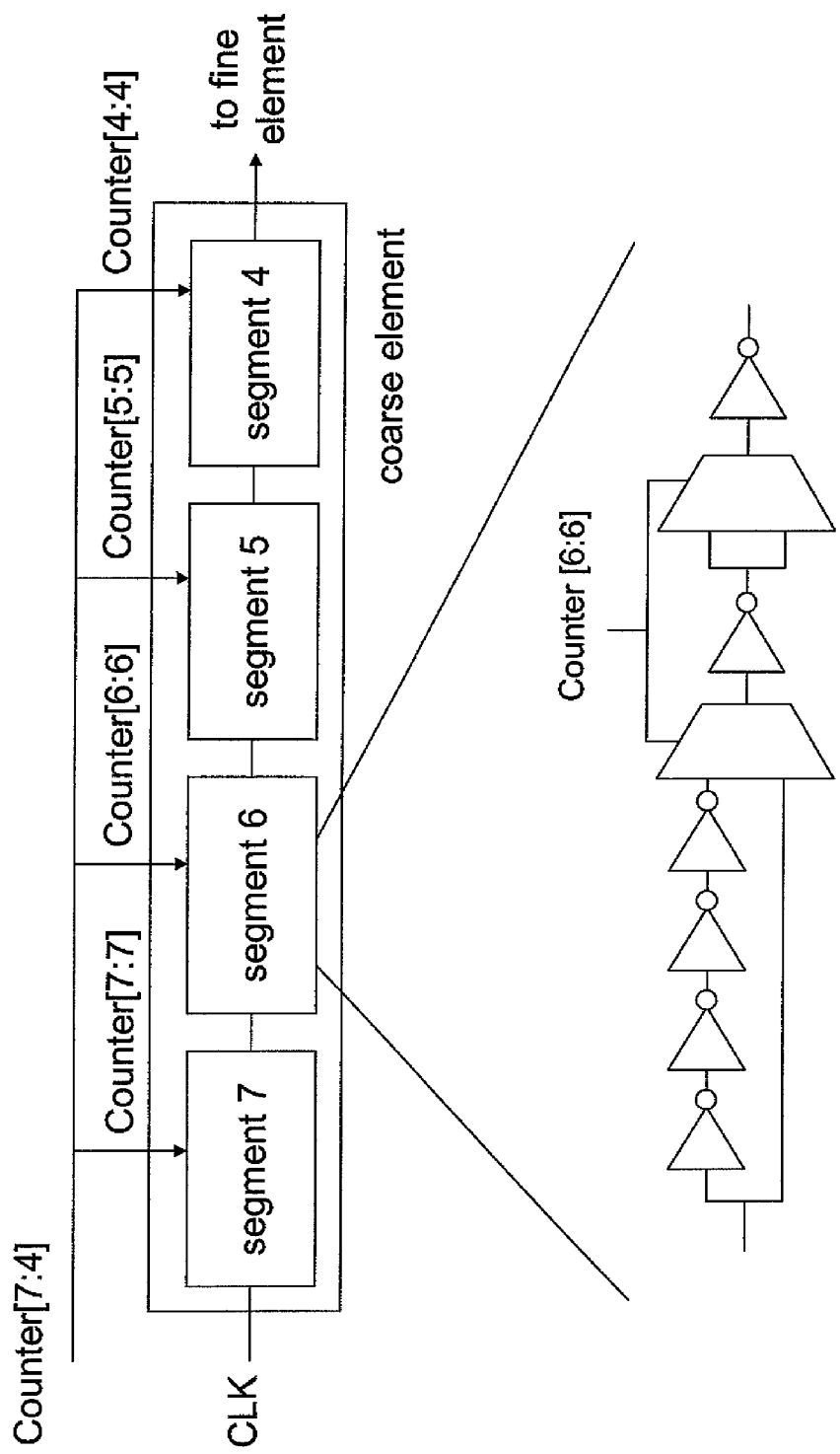
Figure 8C:
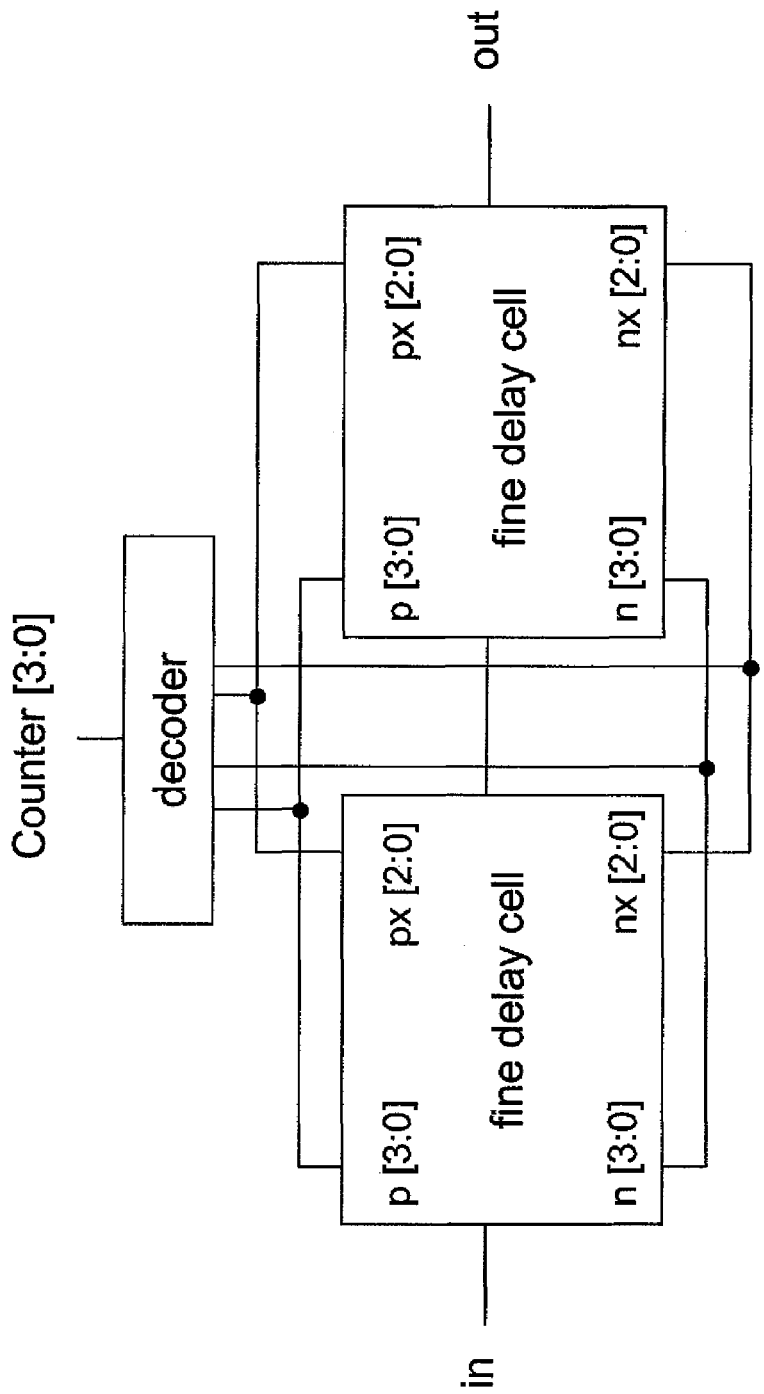
Figure 8D:
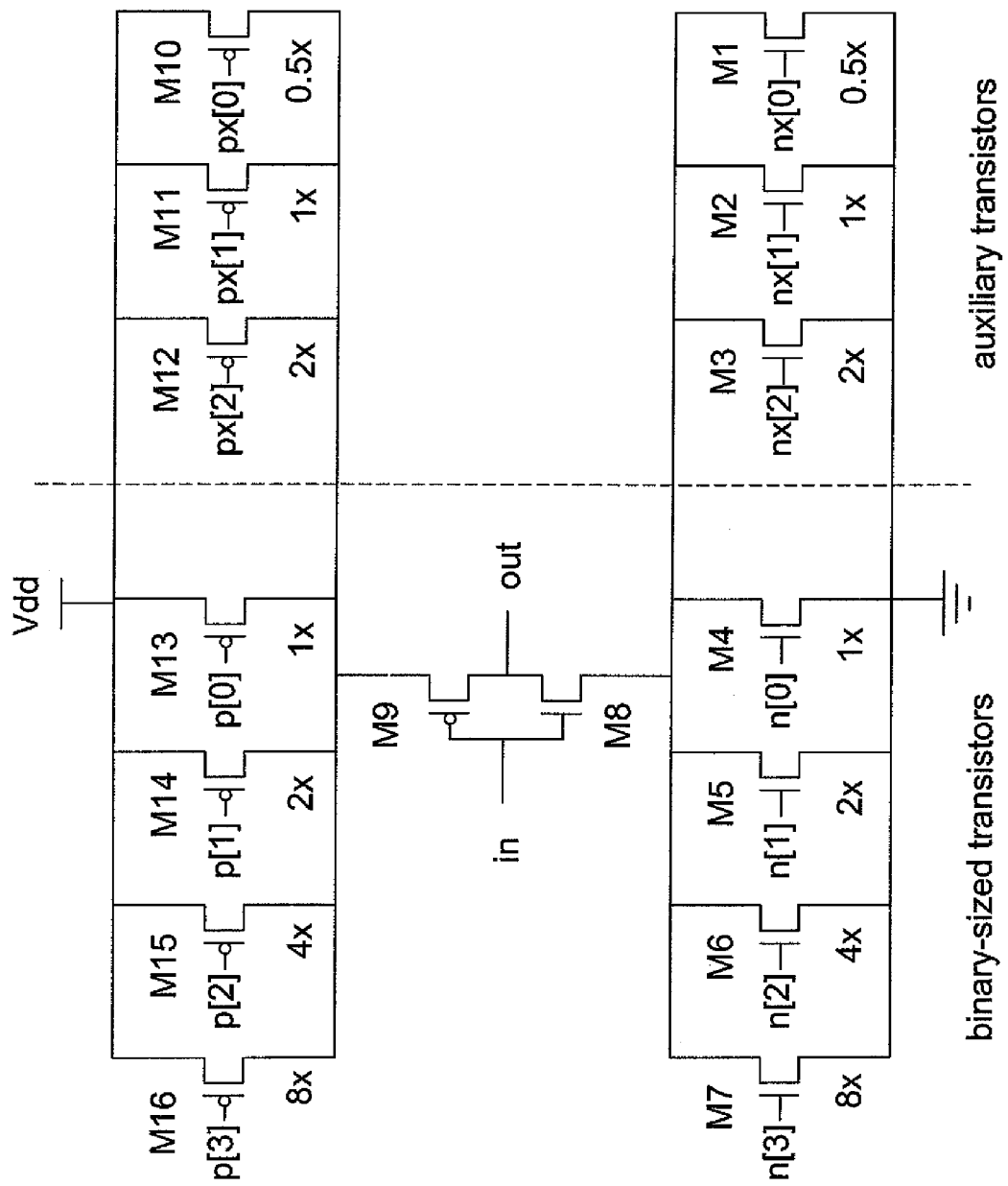

FIG. 8(a) gives a block-level view of a possible implementation of a digitally-controlled delay line suitable for use in the disclosed skew reduction methods. In this design, the count from the corresponding counter is an 8-bit value. The delay line includes coarse and fine delay adjustment elements. Coarse delay adjustment is performed using the most significant bits 7 through 4 of the count value, whereas fine delay adjustment is performed using the least significant bits 3 through 0. Each coarse adjustment element includes 4 cascaded segments, one for each of the 4 bits, such as the one shown in FIG. 8(b). If bit 6 is set, for example, the additional delay of the clock signal is proportional to 4 inverters. In general, for a segment that corresponds to bit i of an n-bit counter, the number of inverters equals $2i-n/2$. The two multiplexers prevent the mismatch between pull-up and pull-down currents that would result in unequal rising and falling edge delays. FIG. 8(c) gives a block level view of a fine delay element which relies on two back-to-back fine delay segments to ensure that rising and falling edge delays remain approximately equal. A possible implementation of a fine delay segment is shown in FIG. 8(d). Further information regarding this design may be found in connection with a design presented with improved linearity in the article, "An All-Digital Phase-Locked Loop with 50-Cycle Lock Time Suitable for High-Performance Microprocessors," by Dunning, J., et al., IEEE JSSC, v. 30, no. 4, pp. 412-422, April 1996, the entire disclosure of which is hereby incorporated by reference. The center transistors M8 and M9 function as an inverter. The remaining binary-weighted transistors work as digitally controlled current sources to change the delay between in and out. The auxiliary transistors are used to compensate for the increased delay at small effective widths due to parasitics from the larger switches, hence improving the linearity of the delay line. The associated coding table is shown in FIG. 8(e).

Numerous alternative implementations of the above-described inter-domain skew adjustment methods are possible. As described above, in some cases, instead of two delay lines, a single delay line can be used. The phase detector can be implemented in a variety of known ways such as the one described in the article, "Testing Scheme for IC Clocks," by Favalli, M., et al., Proceedings of the IEEE International Test Conference, November 1997, pp. 445-449, the entire disclosure of which is hereby incorporated by reference. Moreover, the disclosed method may be extended in a number of ways to accommodate cases involving multiple clock domains. One possible approach is to designate one of the clock domains as the reference domain with respect to which all other domains are adjusted. Domains are adjusted one at a time. When the skew between each domain and the reference falls within the specified range, then the skew between any two domains will fall within roughly the same range.

Any one or more of the above-described skew management techniques may be useful in situations involving a delay adjustment scenario arising from changes during operation. For example, architectures involving both resonant and non-resonant domains may benefit from delay adjustments to address operational timing changes in the non-resonant domains due to a voltage supply change (e.g., voltage scaling). For instance, the operational timing in the non-resonant domains slows down with a lower supply voltage, while the timing in the resonant domains is unaffected. A delay adjustment based on feedback or an external control signal can then minimize any resulting clock skew between the different domains. Similarly, delay adjustments may be useful in the context of frequency scaling. In those cases, a change in the reference clock frequency may affect the timing in the resonant clock domains, but not in the non-resonant domains.

As described above, the disclosed architectures are compatible with SoC design methodologies and existing power reduction approaches. The disclosed architectures may be applicable in a wide range of applications, including mobile devices, small devices, graphics chips, or any application that use batteries. They provide strong advantages in throughput-intensive contexts, such as DSP applications and multimedia CPUs, as well as large savings in parallelizable applications, such as vector processing units and multi-core architectures.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A method of controlling a digital system having a plurality of clock domains, each clock domain having a respective local network and a respective capacitive load discrete from the local network and the capacitive load of any other one of the plurality of clock domains, the method comprising the steps of:
    distributing a reference clock via a global clock distribution network coupled to each of the plurality of clock domains;
    generating a local resonant clock waveform from the reference clock via a clock generator in a first clock domain of the plurality of clock domains;
    resonating the capacitive load of the first clock domain with the local resonant clock waveform via an inductor in the first clock domain independently of the capacitive load of any other one of the plurality of clock domains for resonant distribution of the local resonant clock waveform via the respective local network of the first clock domain; and
    adjusting a programmable delay element disposed on a path carrying the reference clock to the first clock domain or a second clock domain of the plurality of clock domains;
    wherein the adjusting step comprises responding to a control signal directed to controlling the programmable delay element to manage a relative clock phase difference between the first and second clock domains.

2. The method of claim 1, wherein the plurality of clock domains comprises a non-resonant clock domain.

3. The method of claim 1, wherein the adjusting step further comprises overriding a delay adjustment control signal generated from feedback based on a phase difference between the local resonant clock waveform and a clock waveform in the second clock domain.

4. The method of claim 1, wherein the path on which the programmable delay element is disposed carries the reference clock to the first clock domain.

5. The method of claim 1, wherein the path on which the programmable delay element is disposed carries the reference clock to the second clock domain, and wherein the second clock domain is a non-resonant clock domain.

6. The method of claim 1, further comprising the steps of:
    determining a phase difference between the local resonant clock waveform in the first clock domain and a clock waveform in the second clock domain; and
    generating a delay adjustment control signal for the programmable delay element in accordance with the phase difference signal.

7. The method of claim 6, wherein the adjusting step comprises the step of overriding the delay adjustment control signal with the control signal.

8. The method of claim 6, wherein the determining step comprises the step of converting the local resonant clock waveform into a square waveform.

9. The method of claim 1, wherein the programmable delay element comprises a digitally controlled delay line.

10. The method of claim 1, wherein each local network is a grid network.

11. The method of claim 1, wherein each local network is buffer-free.

12. The method of claim 1, wherein each local network is metal-only.

13. A digital system, comprising:
    a global distribution network configured to distribute a reference clock and comprising an adjustable delay element;
    a plurality of clock domains coupled to the global distribution network to receive the reference clock, each clock domain comprising a respective local network and a respective capacitive load discrete from the local network and the capacitive load of any other one of the plurality of clock domains; and
    a controller to adjust the adjustable delay element;
    wherein a first clock domain of the plurality of clock domains comprises an inductor and a clock generator configured to generate a local resonant clock waveform from the reference clock to resonate the capacitive load of the first clock domain with the local resonant clock waveform via the inductor in the first clock domain independently of the capacitive load of any other one of the plurality of clock domains for resonant distribution of the local resonant clock waveform within the first clock domain via the respective local network of the first clock domain, and
    wherein the first clock domain or a second clock domain of the plurality of clock domains is coupled to the global distribution network to receive the reference clock via the adjustable delay element for management by the controller of a relative clock phase difference between the first and second clock domains.

14. The digital system of claim 13, wherein the first clock domain is coupled to the global distribution network via the programmable delay element.

15. The digital system of claim 13, wherein the second clock domain is coupled to the global distribution network via the programmable delay element.

16. The digital system of claim 13, wherein the plurality of clock domains comprises a non-resonant clock domain.

17. The digital system of claim 13, further comprising:
a phase detector coupled to the first and second clock domains to generate a phase difference signal based on the local resonant clock waveform and a local clock waveform in the second clock domain; and
a control circuit coupled to the phase detector and configured to adjust the adjustable delay element based on the phase difference signal.

18. The digital system of claim 17, wherein the controller is configured to override the phase difference signal from the control circuit.

19. The digital system of claim 17, further comprising a rectifier coupled to the phase detector to convert the local resonant clock waveform into a square waveform.

20. The digital system of claim 19, wherein the rectifier comprises a flip-flop configured to receive the local resonant clock waveform as a clock input.

21. The digital system of claim 17, wherein the control circuit comprises an integrator to track the phase difference signal over time.

22. The digital system of claim 21, wherein
the control circuit further comprises control logic responsive to the phase difference signal to generate an increment/decrement signal; and
the integrator comprises a counter configured to receive the increment/decrement signal from the control logic.

23. The digital system of claim 13, wherein the adjustable delay element comprises a digitally controlled delay line.

24. The digital system of claim 13, wherein
the adjustable delay element comprises a first digitally controlled delay line through which the reference clock passes to reach the first clock domain;
the distribution network further comprises a second digitally controlled delay line through which the reference clock passes to reach the second clock domain; and
the controller is configured to control the first and second digitally controlled delay lines individually.

25. The digital system of claim 13, wherein each local network is a grid network.

26. The digital system of claim 13, wherein each local network is buffer-free.

27. The digital system of claim 13, wherein each local network is metal-only.

28. A method of controlling a digital system having a plurality of clock domains, each clock domain having a respective local network discrete from the local networks of the other clock domains, the method comprising the steps of:
distributing a reference clock via a global clock distribution network coupled to each of the plurality of clock domains;
generating a local resonant clock waveform from the reference clock via a clock generator in a first clock domain of the plurality of clock domains;
distributing the local resonant clock waveform via the respective local network of the first clock domain;
adjusting a programmable delay element disposed on a path carrying the reference clock to the first clock domain or a second clock domain of the plurality of clock domains, wherein the adjusting step comprises responding to a control signal directed to controlling the programmable delay element to manage a relative clock phase difference between the first and second clock domains;
determining a phase difference between the local resonant clock waveform in the first clock domain and a clock waveform in the second clock domain; and
generating a delay adjustment control signal for the programmable delay element in accordance with the phase difference signal;
wherein the adjusting step comprises the step of overriding the delay adjustment control signal with the control signal.

29. The method of claim 28, wherein the plurality of clock domains comprises a non-resonant clock domain.

30. The method of claim 28, wherein the path on which the programmable delay element is disposed carries the reference clock to the first clock domain.

31. The method of claim 28, wherein the path on which the programmable delay element is disposed carries the reference clock to the second clock domain, and wherein the second clock domain is a non-resonant clock domain.

32. The method of claim 28, wherein the determining step comprises the step of converting the local resonant clock waveform into a square waveform.

33. The method of claim 28, wherein the programmable delay element comprises a digitally controlled delay line.

34. The method of claim 28, wherein each local network is a grid network.

35. The method of claim 28, wherein each local network is buffer-free.

36. The method of claim 28, wherein each local network is metal-only.

37. A method of controlling a digital system having a plurality of clock domains, each clock domain having a respective local network discrete from the local networks of the other clock domains, the method comprising the steps of:
distributing a reference clock via a global clock distribution network coupled to each of the plurality of clock domains;
generating a local resonant clock waveform from the reference clock via a clock generator in a first clock domain of the plurality of clock domains;
distributing the local resonant clock waveform via the respective local network of the first clock domain;
adjusting a programmable delay element disposed on a path carrying the reference clock to the first clock domain or a second clock domain of the plurality of clock domains, wherein the adjusting step comprises responding to a control signal directed to controlling the programmable delay element to manage a relative clock phase difference between the first and second clock domains;
determining a phase difference between the local resonant clock waveform in the first clock domain and a clock waveform in the second clock domain; and
generating a delay adjustment control signal for the programmable delay element in accordance with the phase difference signal;
wherein the determining step comprises the step of converting the local resonant clock waveform into a square waveform.

38. The method of claim 37, wherein the plurality of clock domains comprises a non-resonant clock domain.

39. The method of claim 37, wherein the path on which the programmable delay element is disposed carries the reference clock to the first clock domain.

40. The method of claim 37, wherein the path on which the programmable delay element is disposed carries the reference clock to the second clock domain, and wherein the second clock domain is a non-resonant clock domain.

41. The method of claim 37, wherein the adjusting step comprises the step of overriding the delay adjustment control signal with the control signal.

42. The method of claim 37, wherein the programmable delay element comprises a digitally controlled delay line.

43. The method of claim 37, wherein each local network is a grid network.

44. The method of claim 37, wherein each local network is buffer-free.

45. The method of claim 37, wherein each local network is metal-only.

46. A digital system, comprising:
- a global distribution network configured to distribute a reference clock and comprising an adjustable delay element;
- a plurality of clock domains coupled to the global distribution network to receive the reference clock, each clock domain comprising a respective local network discrete from the local network of the other clock domain, wherein a first clock domain of the plurality of clock domains comprises a clock generator configured to generate a local resonant clock waveform from the reference clock for distribution within the first clock domain via the respective local network of the first clock domain;
- a controller to adjust the adjustable delay element, wherein the first clock domain or a second clock domain of the plurality of clock domains is coupled to the global distribution network to receive the reference clock via the adjustable delay element for management by the controller of a relative clock phase difference between the first and second clock domains;
- a phase detector coupled to the first and second clock domains to generate a phase difference signal based on the local resonant clock waveform and a local clock waveform in the second clock domain; and
- a control circuit coupled to the phase detector and configured to adjust the adjustable delay element based on the phase difference signal;
- wherein the controller is configured to override the phase difference signal from the control circuit.

47. The digital system of claim 46, wherein the first clock domain is coupled to the global distribution network via the programmable delay element.

48. The digital system of claim 46, wherein the second clock domain is coupled to the global distribution network via the programmable delay element.

49. The digital system of claim 46, wherein the plurality of clock domains comprises a non-resonant clock domain.

50. The digital system of claim 46, further comprising a rectifier coupled to the phase detector to convert the local resonant clock waveform into a square waveform.

51. The digital system of claim 50, wherein the rectifier comprises a flip-flop configured to receive the local resonant clock waveform as a clock input.

52. The digital system of claim 46, wherein the control circuit comprises an integrator to track the phase difference signal over time.

53. The digital system of claim 52, wherein
- the control circuit further comprises control logic responsive to the phase difference signal to generate an increment/decrement signal; and
- the integrator comprises a counter configured to receive the increment/decrement signal from the control logic.

54. The digital system of claim 46, wherein the adjustable delay element comprises a digitally controlled delay line.

55. The digital system of claim 46, wherein
- the adjustable delay element comprises a first digitally controlled delay line through which the reference clock passes to reach the first clock domain;
- the distribution network further comprises a second digitally controlled delay line through which the reference clock passes to reach the second clock domain; and
- the controller is configured to control the first and second digitally controlled delay lines individually.

56. The digital system of claim 46, wherein each local network is a grid network.

57. The digital system of claim 46, wherein each local network is buffer-free.

58. The digital system of claim 46, wherein each local network is metal-only.

59. A digital system, comprising:
- a global distribution network configured to distribute a reference clock and comprising an adjustable delay element;
- a plurality of clock domains coupled to the global distribution network to receive the reference clock, each clock domain comprising a respective local network discrete from the local network of the other clock domain, wherein a first clock domain of the plurality of clock domains comprises a clock generator configured to generate a local resonant clock waveform from the reference clock for distribution within the first clock domain via the respective local network of the first clock domain;
- a controller to adjust the adjustable delay element, wherein the first clock domain or a second clock domain of the plurality of clock domains is coupled to the global distribution network to receive the reference clock via the adjustable delay element for management by the controller of a relative clock phase difference between the first and second clock domains;
- a phase detector coupled to the first and second clock domains to generate a phase difference signal based on the local resonant clock waveform and a local clock waveform in the second clock domain;
- a control circuit coupled to the phase detector and configured to adjust the adjustable delay element based on the phase difference signal; and
- a rectifier coupled to the phase detector to convert the local resonant clock waveform into a square waveform.

60. The digital system of claim 59, wherein the first clock domain is coupled to the global distribution network via the programmable delay element.

61. The digital system of claim 59, wherein the second clock domain is coupled to the global distribution network via the programmable delay element.

62. The digital system of claim 59, wherein the plurality of clock domains comprises a non-resonant clock domain.

63. The digital system of claim 59, wherein the controller is configured to override the phase difference signal from the control circuit.

64. The digital system of claim 59, wherein the rectifier comprises a flip-flop configured to receive the local resonant clock waveform as a clock input.

65. The digital system of claim 59, wherein the control circuit comprises an integrator to track the phase difference signal over time.

66. The digital system of claim 65, wherein
- the control circuit further comprises control logic responsive to the phase difference signal to generate an increment/decrement signal; and
- the integrator comprises a counter configured to receive the increment/decrement signal from the control logic.

67. The digital system of claim 59, wherein the adjustable delay element comprises a digitally controlled delay line.

68. The digital system of claim 59, wherein
the adjustable delay element comprises a first digitally controlled delay line through which the reference clock passes to reach the first clock domain;
the distribution network further comprises a second digitally controlled delay line through which the reference clock passes to reach the second clock domain; and
the controller is configured to control the first and second digitally controlled delay lines individually.

69. The digital system of claim 59, wherein each local network is a grid network.

70. The digital system of claim 59, wherein each local network is buffer-free.

71. The digital system of claim 59, wherein each local network is metal-only.

72. A digital system, comprising:
a global distribution network configured to distribute a reference clock and comprising an adjustable delay element;
a plurality of clock domains coupled to the global distribution network to receive the reference clock, each clock domain comprising a respective local network discrete from the local network of the other clock domain, wherein a first clock domain of the plurality of clock domains comprises a clock generator configured to generate a local resonant clock waveform from the reference clock for distribution within the first clock domain via the respective local network of the first clock domain;
a controller to adjust the adjustable delay element, wherein the first clock domain or a second clock domain of the plurality of clock domains is coupled to the global distribution network to receive the reference clock via the adjustable delay element for management by the controller of a relative clock phase difference between the first and second clock domains;
a phase detector coupled to the first and second clock domains to generate a phase difference signal based on the local resonant clock waveform and a local clock waveform in the second clock domain; and
a control circuit coupled to the phase detector and configured to adjust the adjustable delay element based on the phase difference signal;
wherein the control circuit comprises an integrator to track the phase difference signal over time.

73. The digital system of claim 72, wherein the first clock domain is coupled to the global distribution network via the programmable delay element.

74. The digital system of claim 72, wherein the second clock domain is coupled to the global distribution network via the programmable delay element.

75. The digital system of claim 72, wherein the plurality of clock domains comprises a non-resonant clock domain.

76. The digital system of claim 72, wherein the controller is configured to override the phase difference signal from the control circuit.

77. The digital system of claim 72, further comprising a rectifier coupled to the phase detector to convert the local resonant clock waveform into a square waveform.

78. The digital system of claim 77, wherein the rectifier comprises a flip-flop configured to receive the local resonant clock waveform as a clock input.

79. The digital system of claim 72, wherein
the control circuit further comprises control logic responsive to the phase difference signal to generate an increment/decrement signal; and
the integrator comprises a counter configured to receive the increment/decrement signal from the control logic.

80. The digital system of claim 72, wherein the adjustable delay element comprises a digitally controlled delay line.

81. The digital system of claim 72, wherein
the adjustable delay element comprises a first digitally controlled delay line through which the reference clock passes to reach the first clock domain;
the distribution network further comprises a second digitally controlled delay line through which the reference clock passes to reach the second clock domain; and
the controller is configured to control the first and second digitally controlled delay lines individually.

82. The digital system of claim 72, wherein each local network is a grid network.

83. The digital system of claim 72, wherein each local network is buffer-free.

84. The digital system of claim 72, wherein each local network is metal-only.

* * * * *